(12) United States Patent
Odajima et al.

(10) Patent No.: US 6,407,967 B1
(45) Date of Patent: Jun. 18, 2002

(54) OPTICAL APPARATUS, TRACKING APPARATUS AND OPTICAL DISK APPARATUS

(75) Inventors: Wataru Odajima, Isehara; Shin-ya Hasegawa, Atsugi, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,656

(22) Filed: Dec. 30, 1998

(30) Foreign Application Priority Data

Jun. 10, 1998 (JP) .......................................... 10-162360

(51) Int. Cl.[7] .......................... G11B 7/095; G11B 7/135
(52) U.S. Cl. ............................... 369/44.23; 369/112.11; 369/112.12; 369/120; 369/112.26
(58) Field of Search ............ 369/44.23, 112.11–112.15, 369/112.25, 112.26, 112.28, 120

(56) References Cited

U.S. PATENT DOCUMENTS

| | | | |
|---|---|---|---|
| 5,216,649 A | * 6/1993 | Koike | 369/44.23 |
| 5,231,621 A | * 7/1993 | Matsui et al. | 369/112 X |
| 5,253,236 A | 10/1993 | Latta et al. | |
| 5,258,968 A | 11/1993 | Matsuda et al. | |
| 5,754,503 A | 5/1998 | Senba et al. | |
| 6,137,752 A | * 10/2000 | Sakai | 369/44.23 |

FOREIGN PATENT DOCUMENTS

| | | |
|---|---|---|
| EP | 416283 | 3/1991 |
| EP | 610055 | 8/1994 |
| EP | 0706175 | 4/1996 |
| JP | 59-38939 | 3/1984 |
| JP | 8-306057 | 11/1996 |

OTHER PUBLICATIONS

Patent Abstracts of Japan, Sect. 1624, vol. 17, No. 55, p. 96, for JP 5–151753, Oct. 4, 1993.*

* cited by examiner

*Primary Examiner*—W. R. Young
(74) *Attorney, Agent, or Firm*—Greer, Burns & Crain, Ltd.

(57) ABSTRACT

An optical apparatus can eliminate offset resulting from assembling errors and also can correct offset even in the photodetector of any optical system. An optical disk apparatus for reading information from tracks traces the track with the condensed spot of light beam depending on the tracking error signal obtained from the optical system for tracking error detection. The tracking error detecting optical system includes an optical apparatus having a photodetector for outputting, as the tracking error signal, a differential value of outputs of a plurality of light receiving sections for receiving the light beam condensed by the condenser lens. Also, an optical element is provided for relatively increasing and/or decreasing the amount of receiving light of a light receiving section depending on displacement of the optical axis of the light beam, in order to balance the light received by the light receiving sections and compensate for affect.

29 Claims, 23 Drawing Sheets

OPTICAL APPARATUS, TRACKING APPARATUS AND OPTICAL DISK APPARATUS

The present invention relates to an optical apparatus including a photodetector having a plurality of light receiving sections to receive a condensed light beam, a tracking apparatus including the optical apparatus, and a disk apparatus including the optical apparatus. The present invention particularly relates to an optical apparatus which compensates for offset resulting from displacement of an optical axis of a condensed light beam with respect to a photodetector.

BACKGROUND OF THE INVENTION

A photodetector for receiving a condensed light beam is generally designed as a two-divided detector or a four-divided detector. The two-divided detector has a light receiving section which is divided into a couple of light receiving regions to receive a condensed spot of a condensed light beam. The four-divided detector has a light receiving section divided into four light receiving regions. The two-divided detector is arranged in such a manner that a spot of a condensed beam equally illuminates both light receiving regions. Moreover, the four-divided detector is arranged in such a manner that a spot of a condensed beam illuminates equally the four light receiving regions.

These two-divided detectors and four-divided detectors are used in an optical disk apparatus. The two-divided detector is typically used as a detector for tracking error detection and as a detector for reading information. The four-divided detector is typically used as a detector for focus error detection.

FIG. 1 shows an optical system of an optical disk apparatus. The optical system shown in FIG. 1 includes a detector for tracking error detection and a detector for focus error detection. The light beam emitted from a light source 7 becomes a coherent light beam through a collimator lens 12. The coherent light beam passes a beam splitter and is then focused by an objective lens 20. The focused light beam illuminates a disk 9. The objective lens 20 forms a light beam spot on the disk 9.

The disk 9 is an optical disk on which many information tracks or other targets are formed. In FIG. 1, the optical system structured by including the collimator lens 12, the beam splitter 13, and the objective lens 20 is called a light focusing optical system 8. The light beam focused on a recording surface of the disk 9 is also reflected by the recording surface. Moreover, the light beam is diffracted depending on the information recorded on the disk 9. The reflected light beam is converted to a parallel beam passing through the objective lens 20. Thereafter, the reflected light beam is bent in its light path by 90 degrees with the beam splitter 13. The light beam of which the light path direction has been changed is then passed into a beam splitter 14.

This coherent light beam is split, by this beam splitter 14, to a light beam directed to the optical system 10 for focus error detection and a light beam directed to the optical system 11 for tracking error detection. The optical system 10 for focus error detection comprises a four-divided photodetector 5, an optical system 10a introducing an asymmetrical spot shape of the condensed light beam, and a condenser lens 10b for condensing the light beam on the four-divided photodetector 5. The optical system 11 for tracking error detection comprises a two-divided photodetector 6 and a condenser lens 11a for condensing the light beam on this two-divided photodetector.

The light beam which is deflected by the beam splitter 13 is divided into one light beam input to a reproducing optical system (not illustrated) for reproducing information recorded on the disk 9, and another light beam entered into the beam splitter 14.

In the optical system 11 for tracking error detection, deviation between the information track formed on the disk 9 and the beam spot formed on the disk 9 by the objective lens 20 is detected. As the detecting method, various methods are known. The most popular method utilizes the diffraction phenomenon generated on the recording surface of the disk 9. In a rewritable magneto-optical disk, a guide groove is formed between adjacent tracks. This groove is arranged as many grooves formed in the equal interval in the track width having constant width. Many grooves enables the disk surface to work as the diffraction grating. When a beam spot having a diameter almost equal to the track width is focused on the disk surface and is then reflected therefrom, the mirror-surface reflected light beam and diffracted light beam are generated. The diffracted light beam interferes with the light element reflected by the mirror-surface to largely change the distribution of light beam intensity reflected from the disk 9. The beam could also be directed through the disk 9 if the disk were transparent.

FIG. 2 shows the distribution of reflected beam intensity influenced by the diffracted light beam. FIG. 2(a) shows the distribution of intensity when the beam spot is located at the center of the track. FIG. 2(b) shows the distribution of strength when the beam spot is located at the position deviated by about ¼ the width of the track from the center of the track. Distribution of the light beam intensity is largely different at the portions where the mirror-surface reflected light beam and diffracted light beam are overlapped or not overlapped. In this case, the reflected light beam is divided into a left side region and a right side region with a straight line (broken line A in the figure) which passes the center of the reflected light beam and is parallel to the track. The beam intensity in the left side region of the straight line A is compared with that in the right side region. In the case of FIG. 2(a), the beam intensity in the left side region is equal to that in the right side region. Meanwhile, in the case of FIG. 2(b), since the diffracted beam is unbalanced, a certain difference is generated in the beam intensity of the left side and right side regions. This difference in intensity is detected by the two-divided photodetector having the dividing light parallel to the track on the disk 9. Namely, the difference of output of the two-divided photodetector 6 corresponds to the difference of beam strength and also to the amount of deviation of the spot from the center of the track. Therefore, such amount of deviation is detected in higher accuracy. This method is called a push-pull method.

This push-pull method detects the amount of deviation revealed by the difference of strength of the two-divided photodetector. Therefore, when the beam spot center is deviated from the dividing line of the two-divided photodetector, offset is generated in the differential output of the two-divided photodetector.

FIG. 3 shows the condition where deviation of the optical axis occurs. In FIG. 3, a chain line indicates the main beam 4a of the light beam when the optical axis 20a of the objective lens is aligned with the optical axis of the light beam 4. When the objective lens 20 moves upward (direction of arrow mark B) and is located at the position indicated by a broken line, the main beam of the light beam is input to the objective lens 20, but the main beam of the light beam is deviated from the optical axis 20a of the objective lens 20. The light beam is refracted by the objective lens 20 and is then directed to the disk 9. The light beam is reflected by the disk 9 and is then input to the objective lens 20. The optical axis 4b of the main beam of the incident light beam of the objective lens 20 is deviated upward (direction of arrow mark B) from the optical axis 20a of the objective lens 20. This reflected light beam is indicated by a broken line.

Thereafter, the light beam passes the beam splitters 13, 14 and is then input to the optical system 11 for tracking error detection. Next, this light beam is input to the condenser lens 11a at the position where the main beam thereof is deviated downward (direction of arrow mark C) for the optical axis of the condenser lens 11a of the optical system 11 for tracking error detection. The main beam input to the condenser lens 11a is refracted by the condenser lens 11a and is then input after it is deviated downward (direction of arrow mark C) from the photodetector 6.

The entire part of the light beam reflected by the disk 9 is deviated downward of the photodetector 6 around the optical axis 4b of this deviated main beam. As explained above, if the optical axis of the main beam of the light beam is deflected from the dividing line of the two-divided photodetector, deviation is generated between the symmetrical line of the strength distribution and the dividing line of the two-divided photodetector. Therefore, a differential output of the two-divided photodetector includes offset. This differential output is called as a push-pull signal.

FIG. 4 shows a push-pull signal. The horizontal axis of FIG. 4 indicates the position in the direction crossing the track, while the vertical axis of FIG. 4 indicates level of the push-pull signal.

In FIG. 4, the push-pull signal (a) indicates the push-pull signal in such a case that there is no deviation between the optical axis of the objective lens and that of the light beam input to the objective lens, while the push-pull signal (b) indicates the push-pull signal in such a case that there is a deviation of 200 μm between the optical axis of the objective lens and that of the optical beam input to the objective lens. The push-pull signal (b) corresponds to the case where the objective lens is deviated from the aperture diameter by about 5%. The aperture diameter of the objective lens is 3.3 mm. The track width is 1.1 μm.

The push-pull signal (a) corresponds to the push-pull signal where the condensed spot of light beam has moved, with no displacement of the optical axis, to the groove in the opposite side crossing the track from the one groove of the track. If there is no displacement of the optical axis, the push-pull signal becomes zero when the focus spot is located at the center of the track. When an optical head or objective lens 20 is moved to make the push-pull signal zero, the focus spot can be accurately located to the center of the track. Moreover, the signal waveform of the push-pull signal is perfectly symmetrical in the positive and negative sides of the coordinates 0, so it is the ideal control signal.

The push-pull signal (b) corresponds to the push-pull signal as the focus spot of light beam moves to the groove in the opposite side crossing the track from the one groove of the track when there is a displacement of the optical axis. In this case, if the focus spot is located at the center of the track, the push-pull signal does not become zero. When location of the focus spot is controlled to make the push-pull signal zero, the spot is located to the position deviated from the center of the track. The push-pull signal (b) of FIG. 4 includes the deviation of about 0.1 μm as the offset. This displacement of the optical axis generated when the objective lens moves can be generated by assembling errors of the condenser lens.

In general, when information is read from a disk, positional deviation between a focus spot and a track center is generated due to eccentricity of the disk. The positional deviation between the focus spot and the track center can be corrected when the objective lens 20 moves in the direction crossing orthogonal to the track direction. Since such positional deviation is often generated, movement of the objective lens is also generated frequently and thereby optical axis displacement of the optical beam also occurs frequently. If the optical axis center of the objective lens is deviated by the distance d from the optical axis of the light beam, the optical axis of the reflected beam is deviated by 2d from the optical axis of the objective lens.

If the disk 9 deflects the optical axis of the light beam by an angle $\Theta$, when the focal distance of the objective lens is defined as f, the amount of displacement can be expressed as 2f$\Theta$. In addition, when the track density on the disk becomes higher, the degree of influence by offset due to the optical axis deviation and degree of influence by assembling errors becomes larger.

An offset of the tracking error signal will interfere with the data read/write operation. A typical optical disk apparatus is provided with an optical disk medium having a recording surface in which the width of the information track is about 1 μm. Data is recorded along this information track. In order to read this data, the focus spot of the light beam must be accurately positioned on this information track. The width of the recording pits formed at the center position in the width direction of the track is narrower than the width of the track.

When a condensed spot is deviated too far from the center of the track during a data reading operation, (i) data can no longer be read because the focus spot does not overlap on the recording mark, or (ii) data reading accuracy and speed are lowered because the data signal level becomes lower than the noise signal level.

When a disk is exchangeable for a disk drive and data is written under the condition that track deviation is generated within the disk drive, the data written in such a disk cannot be read in some cases with different disk drives.

Displacement of the optical axis during a focus spot position adjustment can be avoided by conducting a focus spot position adjustment by moving the entire part of the optical pickup including a condensing optical system and optical system for tracking error detection. In this case, since the optical pickup as a whole, which is heavier than the optical system for tracking error detection, is moved, the maximum response rate of a condensed spot position adjusting operation is limited.

Moreover, an offset included in a push-pull signal because of deviation between an optical axis of an objective lens and that of a light beam may be canceled by adding a bias signal to the push-pull signal depending on a signal indicating the amount of movement of an objective lens from a position detector which detects the position of the objective lens. In this case, the position detector and a bias signal adding circuit must additionally be provided.

In addition, as shown in Japanese Laid-Open Patent Application No. SHO 59-38939, there is a method in which an offset compensating signal is produced from a specific shape of pits formed on the track of the disk. In this case, the specific shape of pits must be formed on the disk and thereby the disk format must be changed.

Moreover, as shown in Japanese Laid-Open Patent Application No. HEI 8-306057, there is a method in which an offset compensating signal can be produced using a particular arithmetic formula from many receiving outputs from the photodetector in which the light receiving section is divided into many regions. In this case, a circuit for conducting the arithmetic operation indicated by the particular arithmetic formula must be provided.

In the methods explained above, offset resulting from the condenser lens used in the optical system for tracking error detection and assembling error of the photodetector cannot be corrected. In addition, the methods explained above are proposed to eliminate offset included in the differential output of the photodetector in the optical system for tracking error detection, and these methods cannot be applied as a method of correcting offset of the photodetector of the other optical system, namely, of the optical system for focus error detection and optical system for information reading.

OBJECTS OF THE INVENTION

It is an object of the present invention to provide a new and improved optical apparatus which can eliminate negative effects of offset resulting from assembling errors.

It is another object of the present invention to provide a new and improved optical apparatus which can correct for offset of a light beam or photodetector in any type of optical system.

Still another object of the present invention to provide a new and improved optical apparatus which can easily and economically eliminate the effects of offset without any additional detector and addition of any particular circuit.

Yet another object of the present invention is to provide a new and improved optical apparatus which can move at high speed.

It is a further object of the present invention to provide a new and improved tracking apparatus which can realize a high precision tracking operation.

It is a still further object of the present invention to provide a new and improved optical disk apparatus which can realize a high precision information reading operation.

SUMMARY OF THE INVENTION

In keeping with one aspect of the invention, an optical apparatus has a photodetector including a plurality of light receiving sections to receive a light beam condensed by a condenser lens. An optical element is provided for relatively increasing the amount of receiving light of one light receiving section and relatively limiting or reducing the amount of receiving light of another light receiving section, depending on displacement of the optical axis of the light beam.

In another aspect of the invention, a tracking apparatus is provided for tracking the focus spot of light beam on a track or other target on the basis of a tracking error signal obtained from an optical system for tracking error detection. The optical system for tracking error detection includes an optical apparatus having a photodetector which outputs, as a tracking error signal, a difference value of outputs of a plurality of light receiving sections for receiving the light beam condensed by the condenser lens. It also has an optical device for relatively increasing the amount of light received by one light receiving section, which relatively reduces the amount of receiving light of another light receiving section, depending on displacement of the optical axis of the light beam.

Moreover, an optical disk apparatus for reading information from a track while tracking the focus spot of light beam on the track on the basis of a tracking error signal obtained from an optical system for tracking error detection, can include an optical apparatus having a photodetector and an optical element which compensates for off-track conditions.

BRIEF DESCRIPTION OF THE DRAWINGS

These and other features of this invention and the manner of obtaining them will become more apparent, and the invention itself will be best understood by reference to the following description of an embodiment of the invention taken in conjunction with the accompanying drawings, in which.

DETAILED DESCRIPTION

A preferred embodiment of the present invention will be explained with reference to the accompanying drawings. The attached drawings are included as a part of the specification to form a part thereof in order to explain the principles of the invention in combination with the description of the specification.

Figure 5:
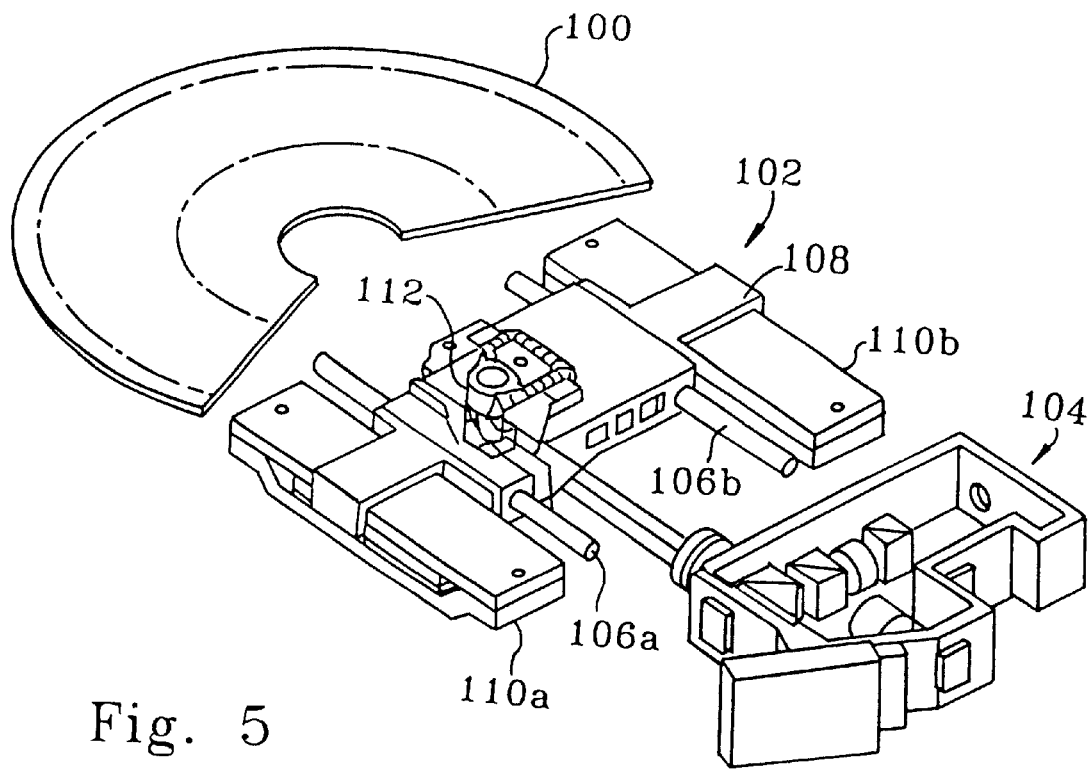
FIG. 5 is a diagram showing a structure of an optical disk apparatus to which the present invention is applied.

FIG. 5 shows a structure of an optical disk apparatus to which the present invention is applied. In FIG. 5, a magneto-optical disk 100 is driven to rotate by a spindle motor (not illustrated). This magneto-optical disk 100 allows formation of many tracks. Between the tracks, a groove is formed.

The magneto-optical disk 100 can be a medium loaded to a 3.5 inch magneto-optical disk cartridge conforming to the ISO format or any other suitable medium. Information recorded on the magneto-optical disk 100 is read using an isolated optical system 102 and a fixed optical system 104. The isolated optical system 102 is structured by including a carriage 108 which is guided by two guide rails 106a, 106b and magnetic circuits 110a, 110b which make reciprocal movement on the carriage 108. The carriage 108 is provided with an optical pickup section 112 which has an objective lens. The fixed optical system 104 is structured by including the condensing optical system, tracking error detecting optical system, focus error detecting optical system and information reading optical system.

Figure 6:
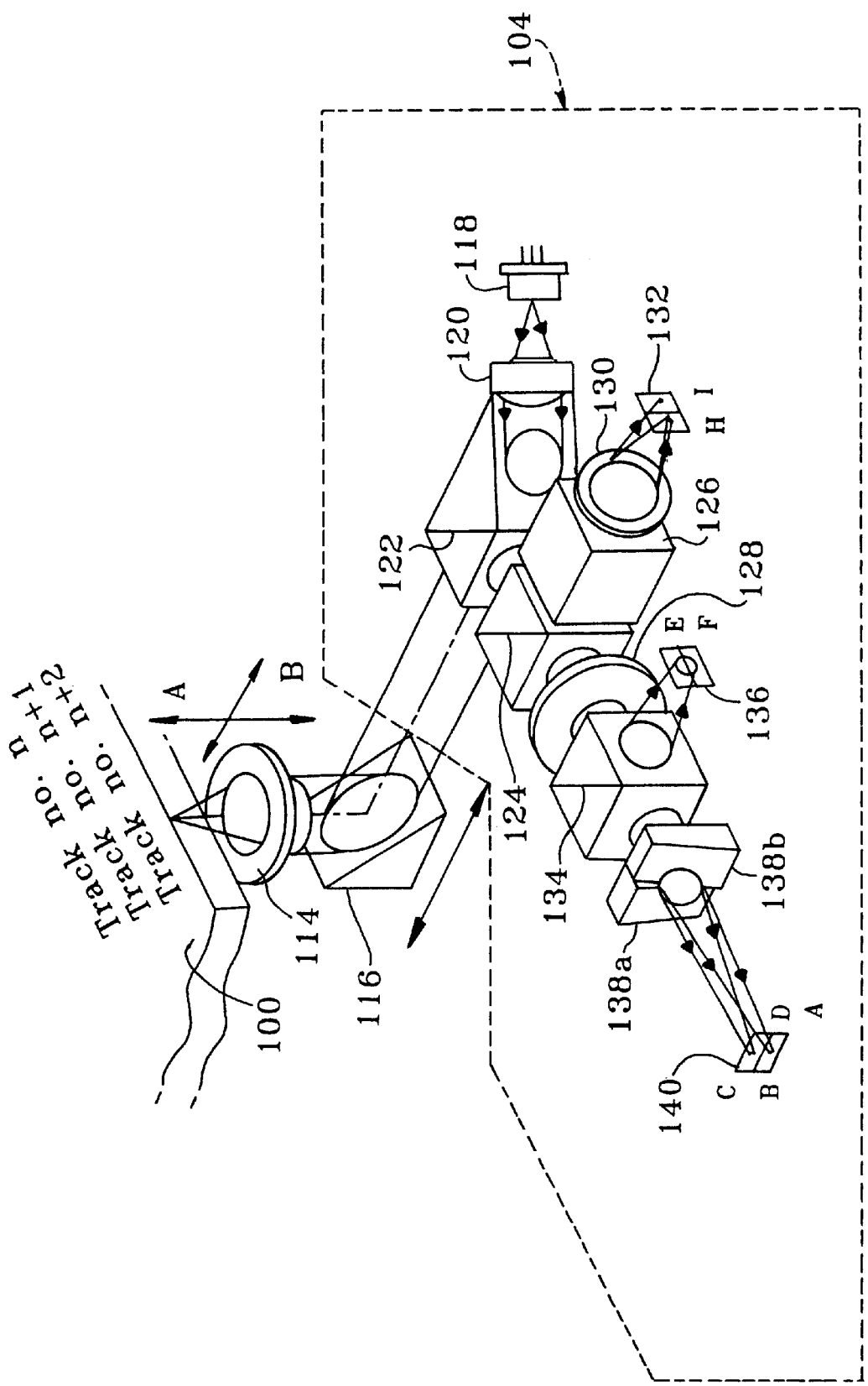
FIG. 6 is a diagram showing a detail structure of portions of the apparatus of FIG. 5.

FIG. 6 shows detail structures of the isolated optical system and fixed optical system. In FIG. 6, only an objective lens 114 and a triangular prism 116 in the isolated optical system 102 are shown. A magnetic circuit to drive the objective lens 114 in the directions of arrow marks A, B is not illustrated. The part enclosed by a broken line is included in the fixed optical system.

A light beam emitted from a semiconductor laser 118 is converted to a parallel beam by a collimator lens 120. This parallel beam is input to a triangular prism 116 via a beam splitter 122. The light beam reflected from the magneto-optical disk 100 is directed to the beam splitter 122 via the objective lens 114 and triangular prism 116.

The light beam could also be diffracted through a transparent disk, if desired, and then directed to appropriate optical processing apparatus.

The beam splitter 122 directs the light path of this reflected beam to a beam splitter 124. The focusing optical system is structured by including the collimator lens 120, beam splitter 122, triangular prism 116 and objective lens 114.

The light beam input to the beam splitter 124 is divided into a couple of light beams directed to a Wollaston prism 126 and condenser lens 128, respectively. The light beam directed to the Wollaston prism 126 is condensed by a condenser lens 130. The condensed spot of the light beam is focused on a two-divided photodetector 132. This two-divided photodetector 132 detects a magneto-optical signal. The magneto-optical signal MO is obtained as a differential output (H–I) of a couple of light receiving sections H, I of the two-divided photodetector 132. The information reading optical system is structured by including the Wollaston prism 126, condenser lens 130 and two-divided photodetector 132.

The light beam input to the condenser lens 128 is condensed by the condenser lens 128 and is divided into a couple of light beams by a beam splitter 134. One light beam passes the beam splitter 134 and is condensed on a two-divided photodetector 136. This two-divided photodetector 136 outputs a tracking error signal. The tracking error signal TE is obtained as a differential output (E–F) of a couple of light receiving sections E, F of the two-divided photodetector 136. The tracking error detecting optical system is structured by including the condenser lens 128, beam splitter 134 and two-divided photodetector 136.

The other light beam passes the beam splitter 134 and a couple of glass sheets 138a, 138b and is then focused to a four-divided photodetector 140. These two sheets of glass plate 138a, 138b are optical systems for introducing an asymmetrical property to the light beam. The four-divided photodetector 140 outputs a focus error signal. The focus error signal FE is obtained on the basis of outputs of four light receiving sections A, B, C, D of the four-divided photodetector 140. Namely, the focus error signal FE is obtained by the arithmetic expression (A–B)+(C–D). The focus error detecting optical system is structured by including the condenser lens 128, beam splitter 134, two sheets of glass plate 138a, 138b and four-divided photodetector 140.

Such a magneto-optical disk drive is disclosed in Japanese Laid-Open Patent Application No. TOKKAI HEI 5-151753.

Figure 7A:
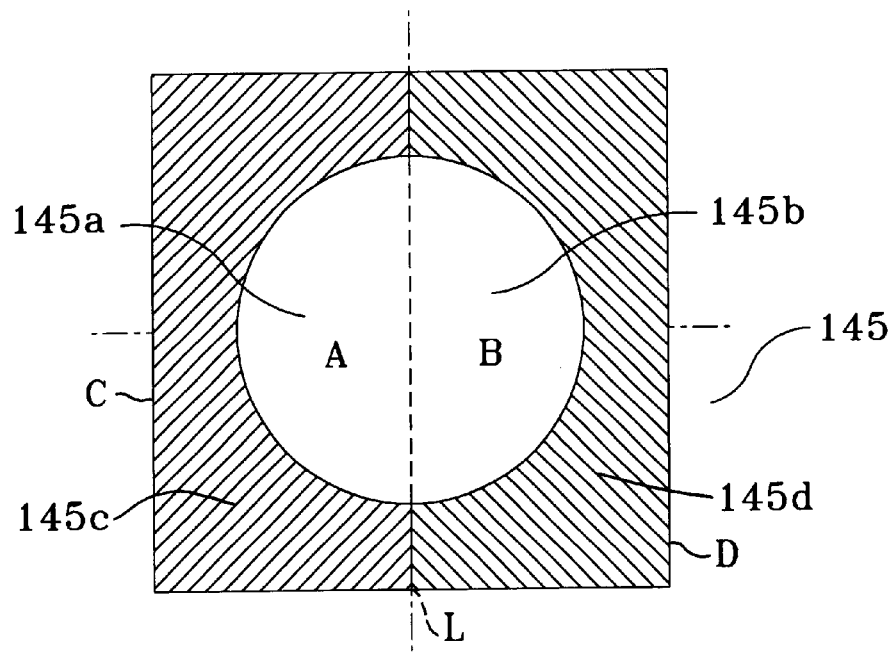
FIGS. 7(a) and 7(b) are diagrams for explaining a first embodiment of the present invention.
Figure 7B:
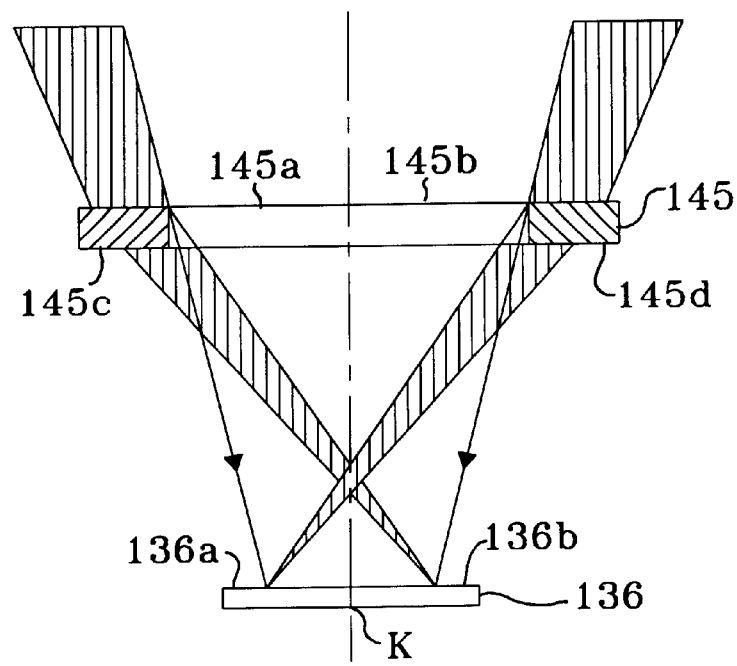

FIGS. 7(a) and 7(b) illustrate a first embodiment of the present invention. A two-divided photodetector 136 detects a tracking error using the push-pull method. In other words, the photodetector 135 has a plurality of light receiving sections, each of which can receive at least a portion of the encoded light beam for purposes of aligning the light beam with a disk track or other target.

An optical element 145 is arranged between the two-divided photodetector 136 and condenser lens 128 (FIG. 6). The optical element 145 balances the distribution of light in the light receiving sections of the photodetector 136 if the optical axis of the light beam is displaced with respect to the light receiving sections when the light beam is aligned with the center of a track on a disk medium or other target.

The optical element 145 is arranged between the condenser lens and the light receiving section. The optical element 145 may be provided between the condenser lens 128 and the beam splitter 134, or attached between the light beam emitting surface of the beam splitter 134 and the photodetector 136. The optical element 145 is provided with a diffraction grating or other light directing device.

FIG. 7(a) shows an optical system viewed from the beam incident direction. FIG. 7(b) shows a light path transmitting through the optical system viewed from the lateral direction. The light receiving section of the two-divided photodetector 136 is divided into two sub-sections by means of a dividing line K. The two-divided photodetector 136 is provided with a first light receiving section 136a and a second light receiving section 136b. An optical axis of the two-divided photodetector 136 is set on the dividing line and at the center in the width direction of the two-divided photodetector 136.

The optical system 145 is divided into a couple of regions with a line L parallel to the dividing line. The optical system 145 is provided with a circular region in which the light beam travels in straight.

This circular region has a diameter which is equal to or a little smaller than the beam diameter of the light beam. The radius of this light beam is preferably 475 $\mu$m at the point where the light beam enters the optical system 145. Meanwhile, the radius of this circular region is set to 460 $\mu$m.

This circular region includes a couple of regions 145a, 145b divided by the dividing line. These two regions 145a, 145b are not provided with diffraction gratings. Therefore, the light beam input to this circular region travels in straight to radiate the two-divided photodetector 136. The regions 145c, 145d at the outside of the circular regions 145a, 145b of the optical system 145 are respectively provided with diffraction gratings. As shown in FIG. 7(b), the diffraction grating of the region 145c causes a part of the light beam input to the region 145c to radiate on the light receiving section 136b of the two-divided photodetector 136. The diffraction grating of the region 145d causes a part of the light beam input to the region 145d to radiate on the other light receiving section 136a of the two-divided photodetector 136.

Here, the push-pull signal DPP of the two-divided photodetector 136 can be obtained by the following arithmetic expression. In this arithmetic expression, each region of the optical system 145 is given the codes A to D and the amount of light input to each region A to D is expressed as IA, IB, IC, ID.

$$DPP(d, K) = \frac{(IA + ID) - (IB + IC)}{IA + IB + IC + ID} \quad (1)$$

Since the amount of light IA to ID changes depending on the amount of the displacement d of the focus spot of light beam focused by the objective lens 114 from the track center and the amount of axial displacement K of the light beam input to the optical element 145, the push-pull signal DPP is expressed as the function DPP(d,K) of these two parameters d, K.

Here, the radius of the circular region formed of the regions 145a, 145b is set to satisfy the following expressions for a certain predetermined value K.

$$DPP(0, K)=0 \quad (2)$$

$$DPP(d\text{max}, K)=-DPP(d\text{min}, K) \quad (3)$$

A value dmax is the amount of displacement of the focus spot from the track center when the push-pull signal becomes maximum. Meanwhile, dmin is the amount of track deviation of the focus spot from the track center when the push-pull signal becomes minimum. Formula (2) indicates the condition that the value of the push-pull signal becomes 0 when the spot is located at the center of the track. Formula (3) indicates the condition where the absolute value of the push-pull signal when the push-pull signal becomes maximum, is equal to the absolute value of the push-pull signal when the push-pull signal becomes minimum. A value of the radius of this circular region indicates the boundary for discriminating the light beam transmitting regions 145a, 145b and light beam diffracting regions 145c, 145d.

The radius of the circle defining the regions can be obtained by executing the arithmetic operations of the condition formulae (2), (3) using the radius as a parameter. As the value of this radius, the optimum value satisfying the conditions of formulae (2), (3) is employed. In FIG. 7, the circular regions 145a, 145b of the optical element 145 are formed as true circles.

Figure 8:
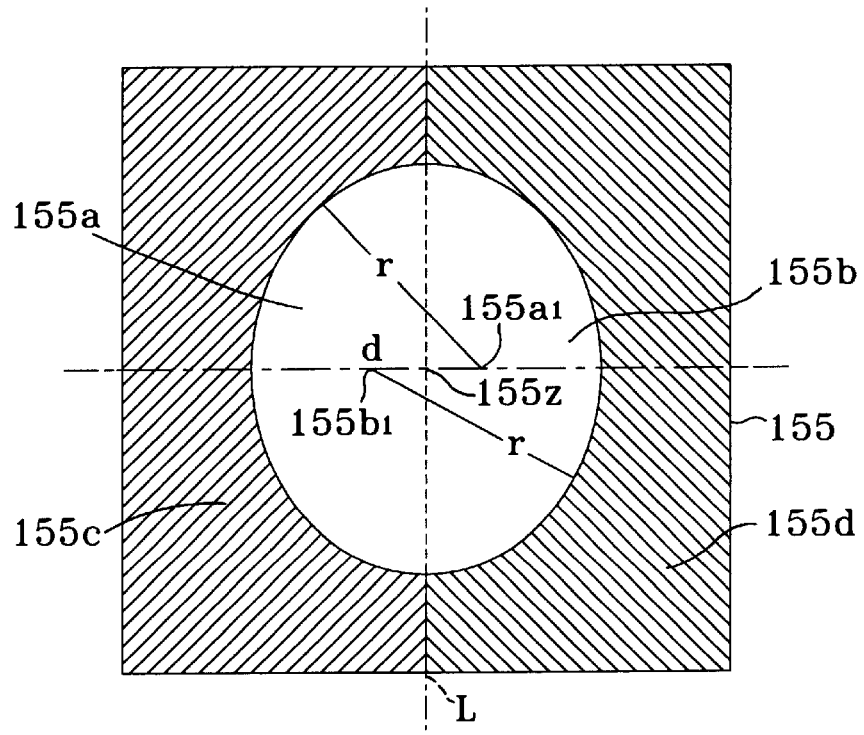
FIG. 8 is a diagram showing an optical element in which the inner region thereof is formed of a couple of semi-circular regions.

FIG. 8 is a diagram showing an optical element in which the circular regions thereof are formed of a couple of arcs. In FIG. 8, the optical element 155 has a region for transmission of a light beam consisting of a first region 155a and a second region 155b. The optical element 155 has a region for diffraction of the light beam consisting of a first region 155c and a second region 155d. This first region 155c and second region 155d are partitioned by the line L parallel to the track direction. The first and second regions 155a, 155b are circular regions in radius r. The center 155a1 of the first circular region 155a is displaced by the distance d from the center 155z of the optical axis of the optical element 155. The center 155b1 of the second circular region 155b is displaced by the distance d from the center 155z of the optical axis of the optical element 155. The displacing direction of the distance d crosses the dividing line L orthogonally. When such an optical element 155 is used, since there are two factors of freedom of the radius r and the eccentric position d as the design parameters, the design values (values of the radius r and eccentric position d) satisfying the condition formulae can surely be obtained.

Figure 9:
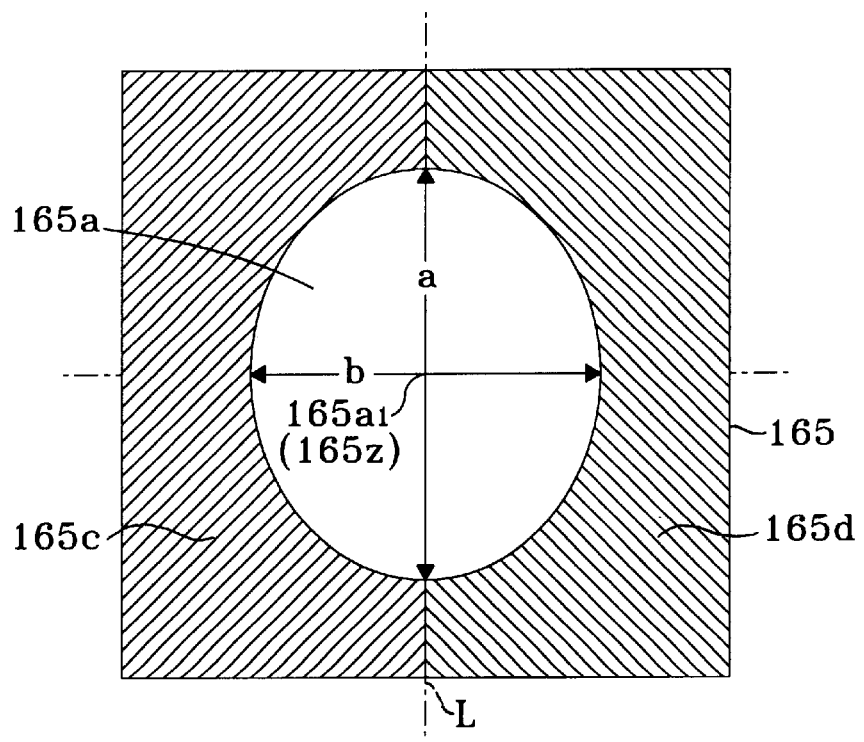
FIG. 9 is a diagram showing an optical element in which the inner region thereof is formed with an elliptical shape.

FIG. 9 is a diagram showing an optical element in which the circular region of the optical system is formed in an elliptical shape. In FIG. 9, the optical element 165 has the region for transmission of the light beam formed as the elliptical region 165a indicated by a long axis a and a short axis b. The optical element 165 has the light beam diffracting region consisting of the first region 165c and the second region 165d. The first region 165c and second region 165d are partitioned by the line L parallel to the track direction. The center position 165a1 of the elliptical region 165a is matched with the center of the optical axis 165z of the optical element 165. As will be apparent from FIG. 9, the long axis a of the elliptical region 165a extends in the direction parallel to the dividing line L, namely, in the track direction. The short axis b extends in the direction orthogonal to the dividing line L, namely, in the direction across the track. When such an optical element 165 is used, there are two parameters of the long axis a and short axis b as the design parameters, and therefore it is possible to obtain the value which uniquely satisfies the condition formulae.

Figure 2A:
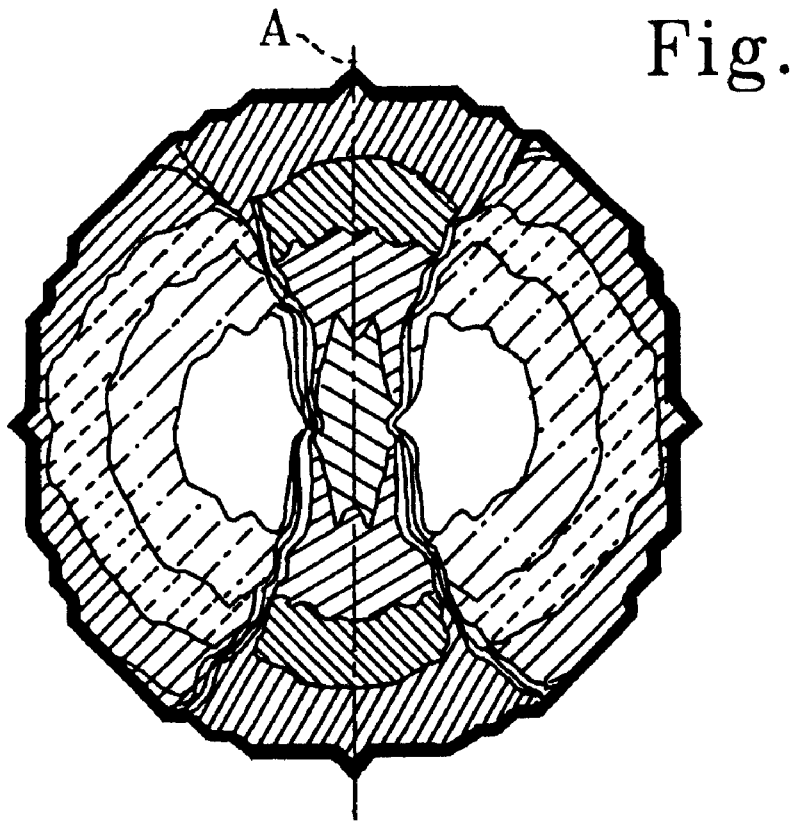
FIGS. 2(a) and 2(b) are diagrams showing the intensity distribution of a reflected beam influenced by a diffracted beam.
Figure 2B:
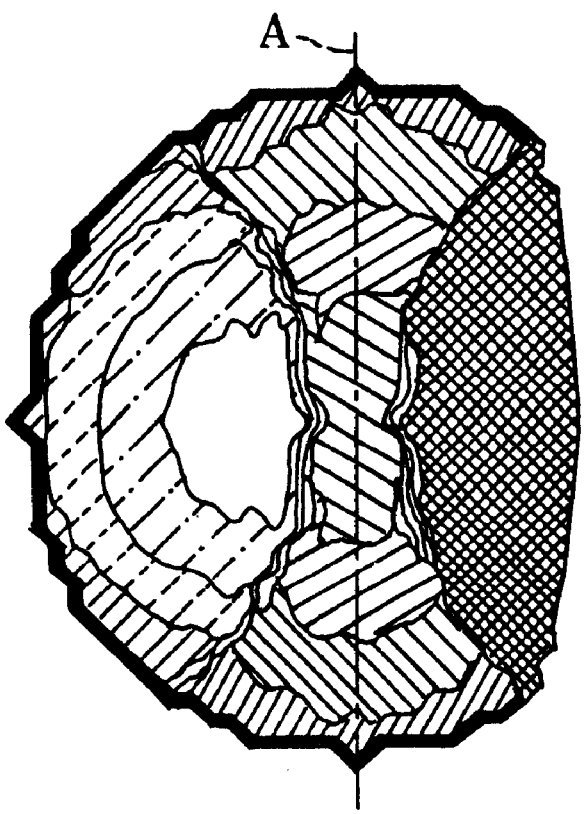
Figure 3:
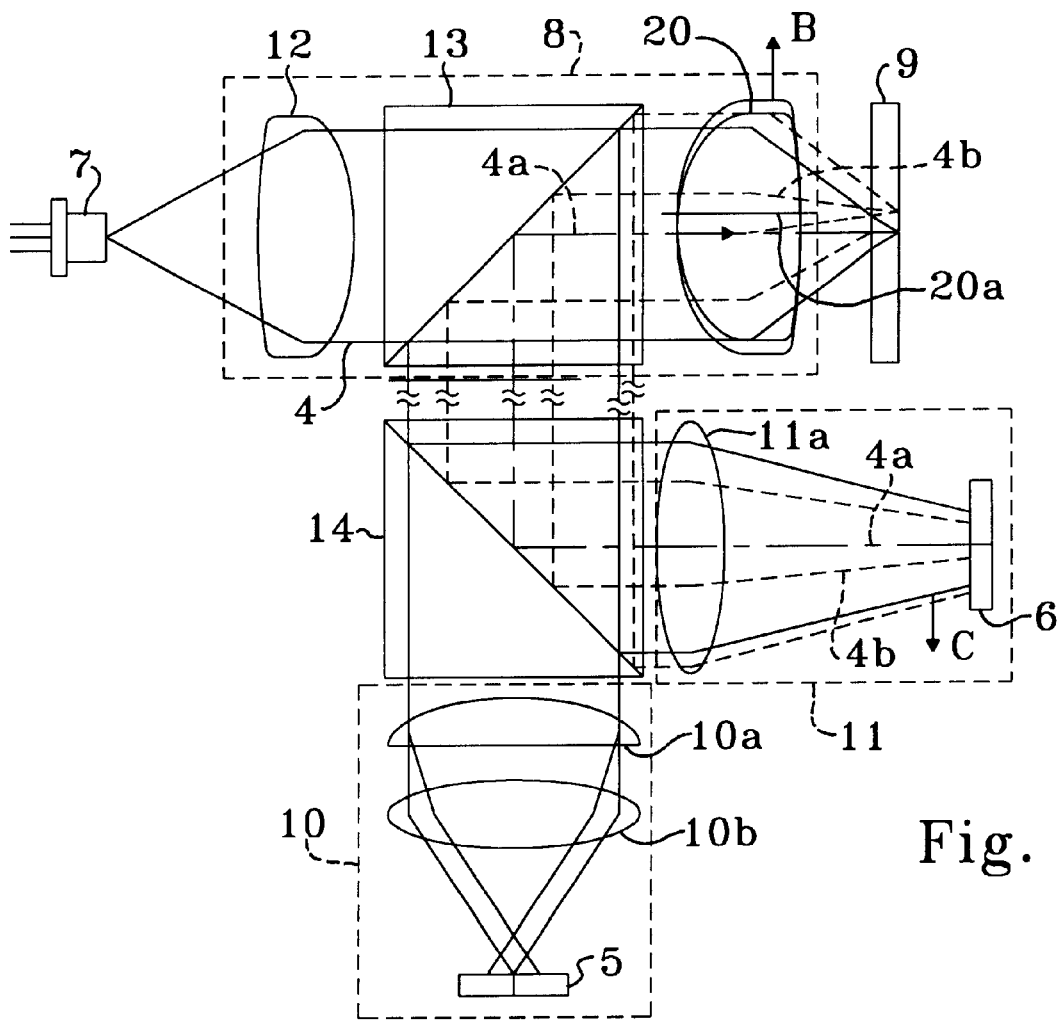
FIG. 3 is a diagram showing the condition that optical axis displacement is generated.
Figure 4:
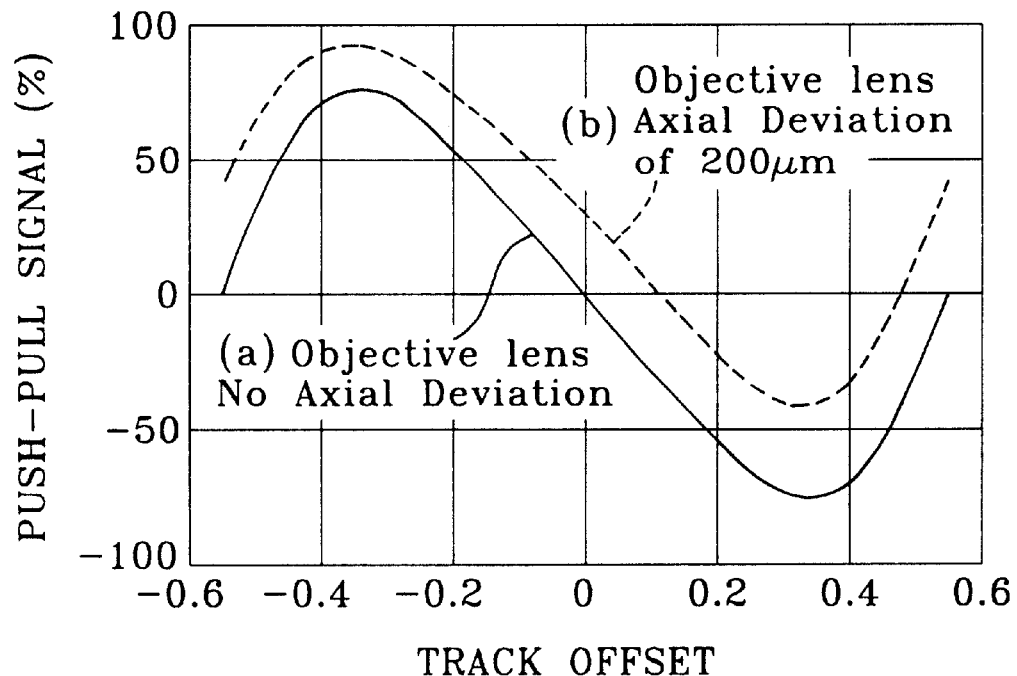
FIG. 4 is a diagram representing a push-pull signal.
Figure 10:
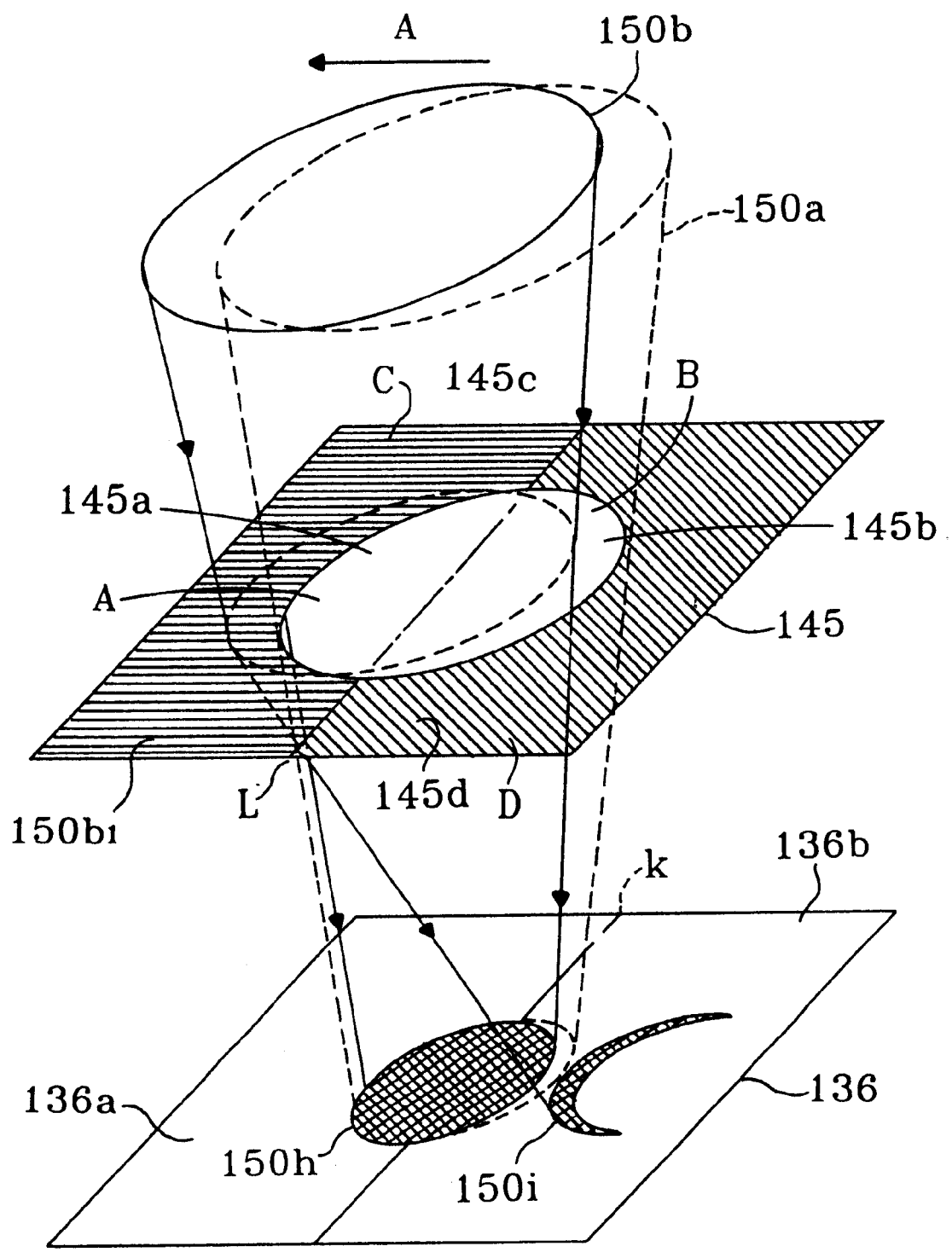
FIG. 10 is a diagram showing the condition that the optical axis of the light beam input to the optical element is deflected from the optical axis of the optical element.

FIG. 10 is a diagram showing the condition that the optical axis of the light beam input to the optical element is deviated from the optical axis of the optical system. This displacement of the optical axis of the light beam is generated due to movement of the objective lens 114 or assembling error of the condenser lens 128, etc. The generation of optical axis displacement is explained in regard to FIGS. 1 to 3.

The optical system shown in FIG. 10 uses the optical element 145 as shown in FIG. 7. The light beam 150a indicated by a dotted line is such that the optical axis of the light beam 150a matches with the optical axis of the optical element 145. Namely, the optical beam 150a is matched with the circular regions 145a, 145b of the optical element 145. Since the light beam 150a is not diffracted when passing through the circular regions 145a, 145b, the light beam 150a passing the circular region 145a totally illuminates the light receiving section 136a of the two-divided photodetector 136, while the light beam 150a passing the circular region 145b totally illuminates the light receiving section 136b of the two-divided photodetector 136. In this case, the amounts of receiving light of both the light receiving section 136a and the light receiving section 136b of the two-divided photodetector 136 is equal. Therefore, there is no relative difference in the amount of receiving light of the light receiving sections 136a, 136b.

Meanwhile, the light beam 150b indicated by a solid line is deflected, in its optical axis of the light beam 150b, in the direction of arrow mark A for the optical axis of the optical element 145. In the same manner, the condensed light spot 150h focused on the two-divided photodetector 136 is deviated to the side of the light receiving section 136a of the two-divided photodetector 136. The light receiving section 136a of the two-divided photodetector 136 receives the condensed light spot 150h in the amount larger than that of the light receiving section 136b. On the contrary, with respect to the amount of receiving light only related to the condensed light spot 150h, the light receiving section 136a receives a relatively larger amount than that of the light receiving section 136b.

Here, the term "relatively" refers to a comparison based on the amount of receiving light when the light beam 150b passing only within the range of the circular regions 145a, 145b of the optical element 145 is received by the light receiving sections 136a, 136b of the two-divided photodetector 136.

Here, a part 150b1 of the light beam 150b is diffracted by the diffracting region 145c of the optical element 145. This diffracted light illuminates, as the condensed spot 150i in the crescent shape, the light receiving section 136b of the two-divided photodetector 136. Since the light beam 150b is not diffracted by the diffracting region 145d of the optical element 145, the diffracted light does not illuminate the light receiving section 136a of the two-divided photodetector 136. Since the light receiving section 136b receives both condensed spot 150h and the crescent-shaped condensed spot 150i, imbalance in the amount of receiving light between the light receiving sections 136a and 136b is reduced. As explained above, the amount of the light beam passing the circular regions 145a, 145b received by the light receiving section 136b is relatively lower than the amount of light beam passing the circular regions 145a, 145b received by the light receiving section 136a. On the other hand, since the light beam does not pass the diffraction grating 145d, the amount of receiving light of the light receiving section 136a does not increase, but since the light beam passes the diffraction grating 145c, the amount of receiving light of the light receiving section 136b increases.

Namely, the diffraction grating 145c relatively increases the amount of receiving light of the light receiving section 136b, which would otherwise be relatively reduced depending on the optical axis displacement of the light beam, in comparison with the amount of the light beam of the light receiving section 136a in which the amount of receiving light would increase relatively, depending on the optical axis displacement of the light beam. The amount of receiving light in the light receiving section 136b would otherwise be relatively reduced in comparison with amount of receiving light of the light receiving section 136a. Namely, the light not received by the other light receiving section 136a due to the optical axis displacement of the light beam is polarized by the optical element 145 and is then input to the light receiving section 136b in which the amount of receiving light would otherwise be reduced due to the optical axis displacement of the light beam.

Here, "relatively" is used because comparison is made for the amount of receiving light when the light beam 150b passing only the regions of the diffraction grating regions 145c, 145d of the optical element 145 is received by the light receiving sections 136a, 136b of the two-divided photodetector 136.

In FIG. 10, as an example of imbalance in the amount of receiving light of the light receiving sections 136a and 136b, movement of the objective lens 20 in parallel to the disk 9 is explained. Axial displacement of the light beam input to the two-divided photodetector 136 is also generated when the assembling position of a condenser lens is deviated. Moreover, such axial displacement is also generated when the disk 9 is inclined against the objective lens 20. If these axial displacements are generated, the light beam condensed by the condenser lens is indicated as the light beam 150b for the optical element 145 as shown in FIG. 10. Therefore, imbalance in the amount of receiving light resulting from these axial displacements may be corrected by the optical element 145 provided between the condenser lens and two-divided photodetector 136.

Moreover, similar to an optical system for focus error detection and an optical system for information reading, imbalance in the amount of receiving light of the two-divided photodetector and four-divided photodetector is also generated if there is deviation of the assembling position of the condenser lens and inclination of the disk. Such imbalance in the amount of receiving light can be corrected by introducing an optical element 145 to these optical systems.

Figure 11:
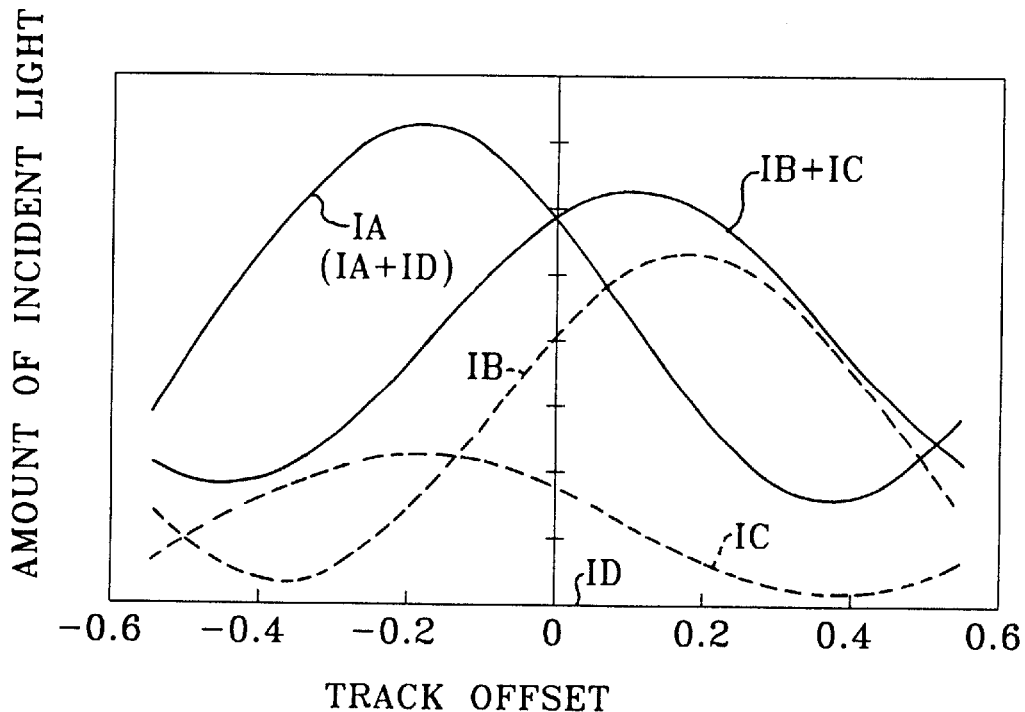
FIG. 11 is a diagram showing the amount of a light beam passing the regions A to D of the optical element of FIG. 10.

FIG. 11 is a diagram showing the amount of receiving light passing the regions A to D of the optical element. In FIG. 11, a change in the amount of incident light is indicated when the focus spot is moved from track to track when the optical axis of the objective lens 114 is deviated by 200 μm from the optical axis of the focusing optical system in the direction crossing the track. When the focusing spot is located at the track center and the optical axis of the objective lens 114 is deflected by 200 μm, the incident light beam of the optical element 145 and two-divided photodetector 136 exists at the position indicated by a solid line in FIG. 10. The amount of light IA indicates the amount of light in the region A. The amount of light IB indicates the amount of light in the region B. The amount of light IC indicates the amount of light in the region C, and the amount of light ID indicates the amount of light in the region D.

As shown in FIG. 11, a difference is generated between the amount of light IA in the region A and the amount of light IB in the region B, due to axial displacement of the objective lens 114. Since the tracking servo control is conducted in such a manner that the push-pull signal is to be zero, the amounts of light IA and IB are controlled to be equal. The point where the absolute values of the amounts of light IA and IB are matched with each other is shifted in the positive direction from the position where the track offset value is zero.

A value in the amount of light IC of the diffraction grating region C changes depending on relative movement of the condensed spot and track. The value obtained by adding the amount of light IC to the amount of light IB is indicated as the amount of light IB+IC. A value of the amount of light ID of the diffraction grating region D increases after a part of the light beam 150b has reached the position passing the diffraction grating region 145d. In FIG. 11, the amount of light ID is zero. The amount of light IC is given, as explained using FIG. 10, to the light receiving section 136b to which the amount of light IB is given. Therefore, the amount of incident light of the light receiving section 136b becomes equal to the amount of light (IB+IC) obtained by adding the amount of light IB and amount of light IC. Since the amount of light IC is input to the detector in the opposite side, imbalance between a couple of light receiving sections can be corrected. In FIG. 11, when the track offset value is 0, a total amount of receiving light of the two light receiving sections 136a, 136b is equal. Namely, offset of the push-pull signal generated by shift of the light beam can be eliminated by providing the optical element 145. This means that the condition in formula (2) is satisfied.

Figure 12:
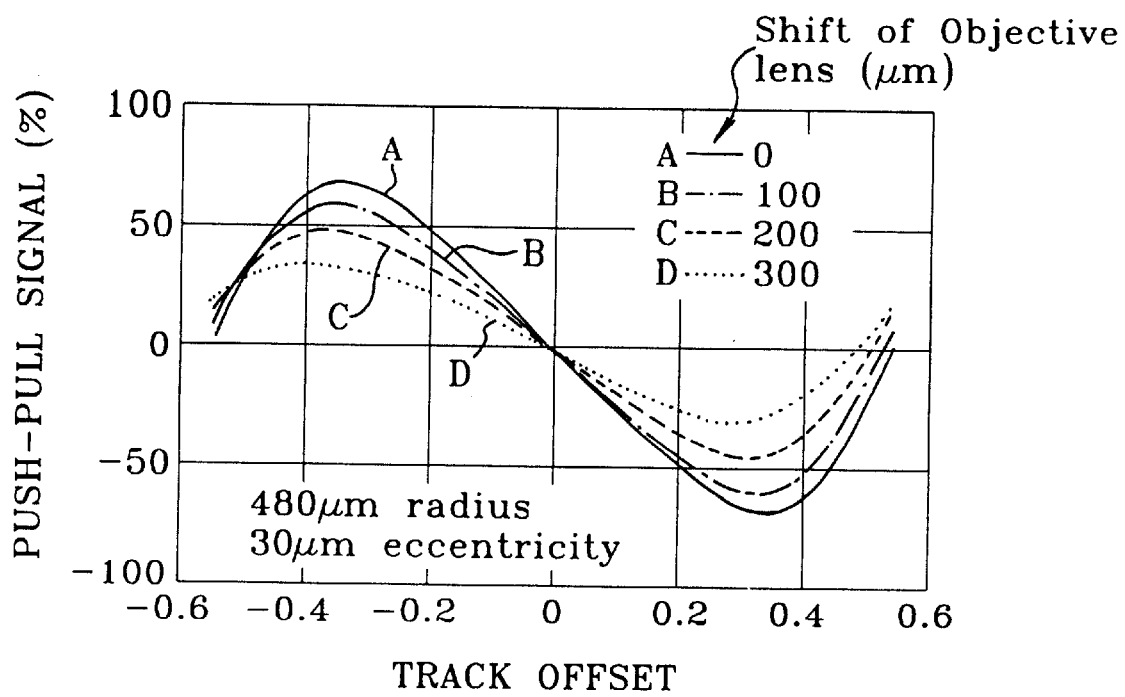
FIG. 12 is a diagram showing change of the push-pull signal generated by the optical element of FIG. 10.

FIG. 12 shows change of the push-pull signal. The waveform A is the push-pull signal when deviation of the objective lens is 0 μm. The waveform B is the push-pull signal when deviation of the objective lens is 100 μm. The waveform C is the push-pull signal when deviation of the objective lens is 200 μm. The waveform D is the push-pull signal when deviation of the objective lens is 300 μm.

A differential value of the amount of light IA and the amount of light (IB+IC) is the push-pull signal. Namely, the push-pull signal TE can be expressed as IA−(IB+IC). As is apparent from FIG. 12, the push-pull signal changes only the amplitude depending on change of the axial displacement of the objective lens, and keeps the symmetrical waveform around the zero point. This property of the waveform of the push-pull signal in the present invention maintains linearity at the area near the track center, and enables generation of a stable control signal.

In this embodiment, the two-divided photodetector, which is the same as that used in the ordinary push-pull method, is used as the photodetector to improve the spot position signal. Therefore, an existing detecting system including the arithmetic circuit may be applied easily.

In addition, as the reference of the track center of the push-pull signal, the spot position where the push-pull signal becomes 0 is used. Meanwhile, the present invention allows the application of the method in which the reference point of the push-pull signal at the track center is set at the intermediate point between the peak and bottom points of the push-pull signal.

When a method is employed in which the reference point of the track center is set to the intermediate point between the peak and bottom points of the push-pull signal, the influence of stray light can be alleviated. This is because the optical system satisfies the condition of formula (3). Since the stray light exists, if light of constant intensity is input to one input of the two-divided photodetector, unexpected bias is generated in the push-pull signal. This bias can be eliminated by setting the center point between the peak and bottom of the push-pull signal as the reference of the track center. Thereby, since symmetry in the positive and negative sides of the push-pull signal near the track center is maintained, good linearity of the push-pull signal can be maintained at the area near the track center, to assure stable control.

Figure 1:
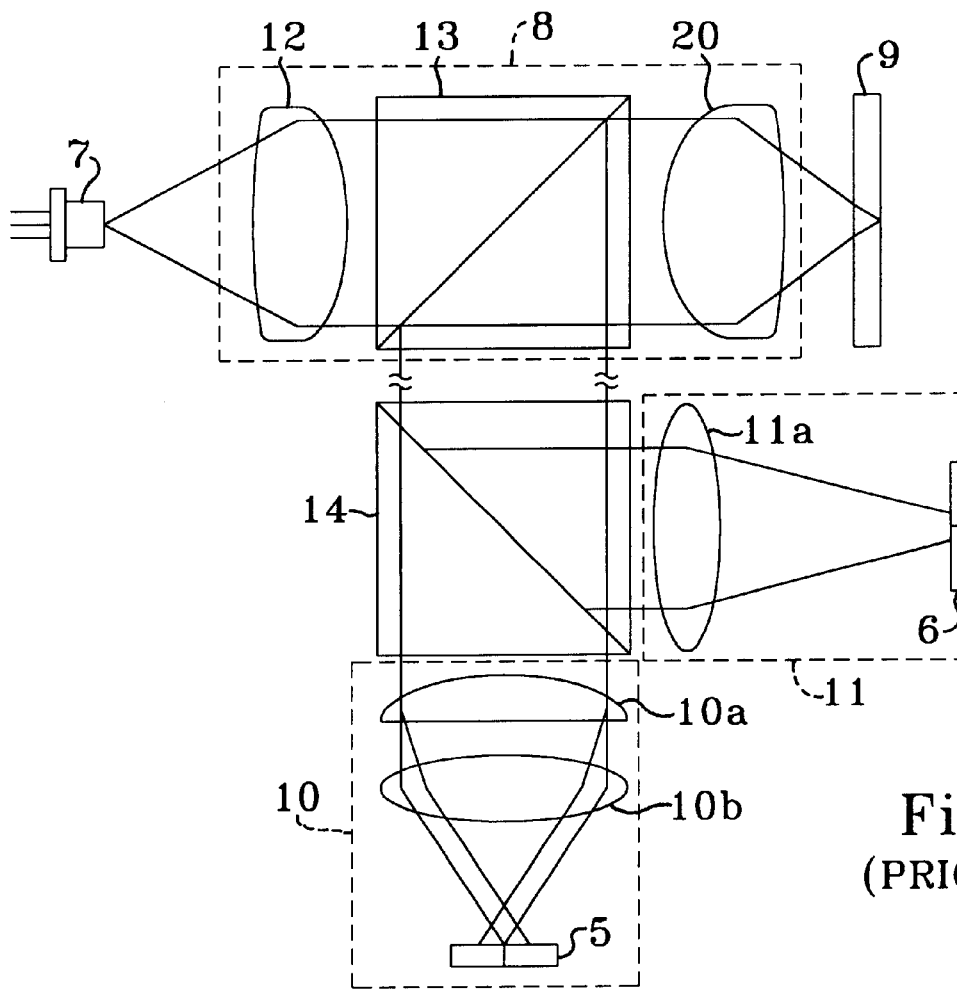
FIG. 1 is a diagram showing an optical system of an optical disk apparatus.
Figure 13:
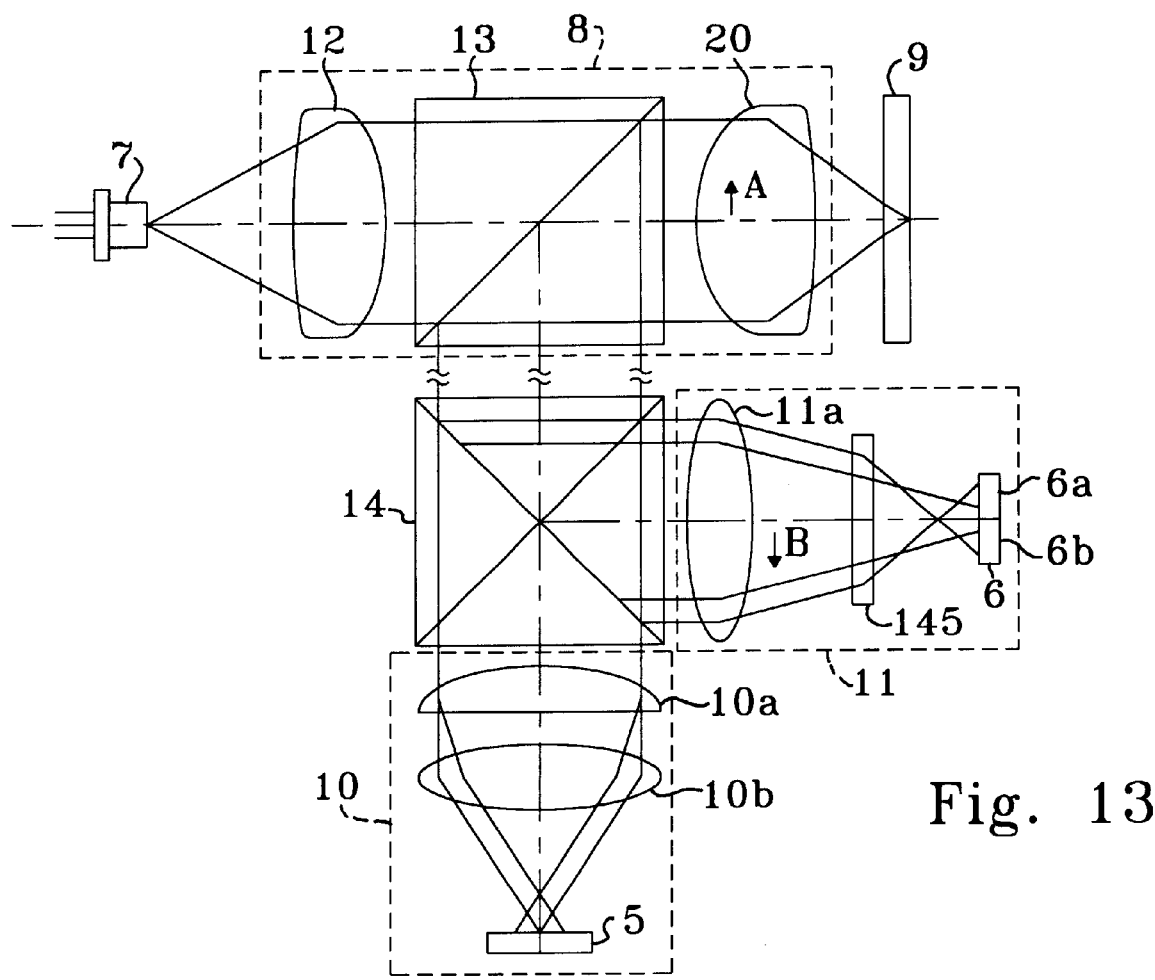
FIG. 13 is a diagram showing the optical system of the optical disk apparatus including the optical element shown in FIG. 7.

FIG. 13 shows an optical system of an optical disk apparatus which has the optical element shown in FIG. 7. In FIG. 13, the structural elements which are the same as those in FIG. 1 are designated by the same reference numerals and the same explanation is omitted.

In FIG. 13, an optical element 145 is provided within the optical system for tracking error detection. The optical system 11 for tracking error detection is structured by including a two-divided photodetector 6, an optical element 145 and a condenser lens 11a. The two-divided photodetector 6 and optical element 145 correspond to an optical apparatus. Moreover, a differential value of the two-divided photodetector 6 is input to a tracking control section as the tracking error signal. The tracking control section drives, depending on the input tracking error signal, a tracking coil which reciprocally moves the objective lens 20 in parallel to the surface of disk 9. The tracking coil is driven to cause the tracking error signal to be zero so that the focus spot is always located at the track center. The tracking error detecting optical system 11 and tracking control section correspond to a tracking apparatus.

The optical element 145 is arranged between the two-divided photodetector 6 and the condenser lens 11a. As explained above, the optical element 145 has a region, in its center area, which is equal to or smaller than the light beam diameter, and transmits the input light beam. The optical element 145 is provided, at the external region of this center area, with a diffraction grating which is divided into two subsections by the dividing line parallel to the dividing line of the two-divided photodetector 6, and is designed to cause the light beam input to such subsections to be incident to a photodetecting portion in the opposite side of the dividing line.

When the optical axis of the objective lens 20 is not deflected from the optical axis of the condensing optical system 8, the light beam condensed by the condenser lens 11a passes only the center region of the optical element 145. Meanwhile, when the optical axis of the objective lens 20 shifts in the direction of arrow mark A, the light beam condensed by the condenser lens 11a is deviated in the direction of arrow mark B. The amount of light passing the center region of the optical element 145 received by the light receiving section 6b increases in comparison with the amount of light passing the center region of the optical element 145 received by the light receiving section 6a. Simultaneously, a part of the light beam condensed by the condenser lens is diffracted by the diffracting region 145c of the optical element 145 and is then input to the light receiving section 6a of the two-divided photodetector 6. Therefore, the amount of receiving light of the light receiving section 6a increases to correct imbalance in the amounts of receiving light of the light receiving sections 6a and 6b.

Figure 14A:
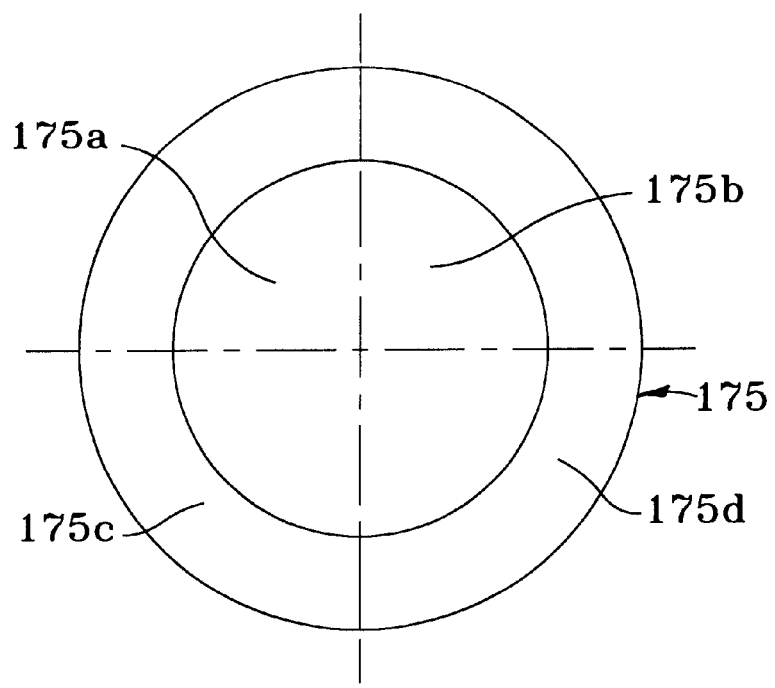
FIGS. 14(a) and 14(b) are diagrams showing another example of the optical element of the present invention.
Figure 14B:
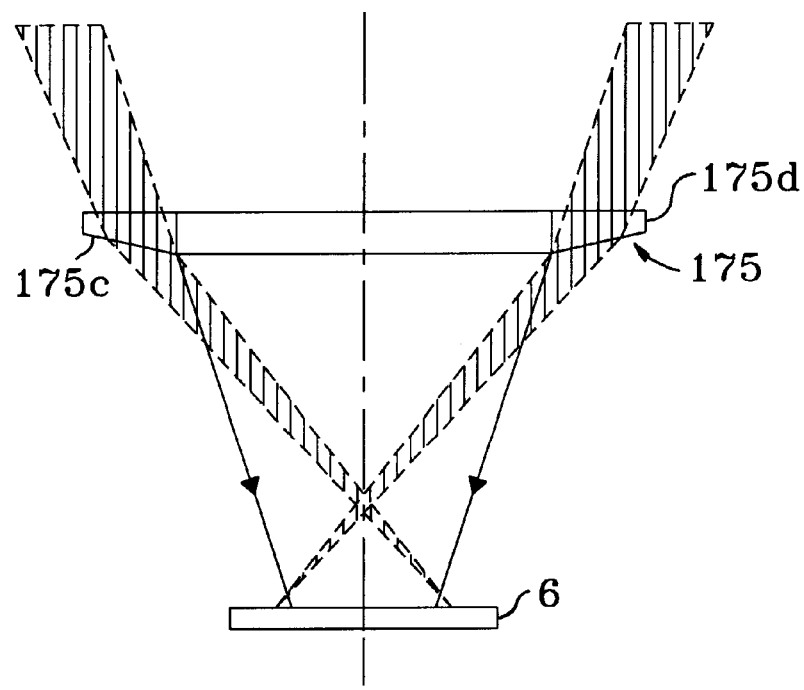

FIG. 14 shows another example of the optical element. FIG. 14(a) shows a light path of light passing the optical element viewed from the beam incident direction. FIG. 14(b) shows a light path of light passing the optical system viewed from the lateral direction. In FIGS. 14(a) and 14(b), an optical element 175 is provided with circular regions 175a, 175b in which the light beam travels in straight. This circular region has a diameter which is equal to or a little smaller than the light beam diameter. This circular region includes a couple of regions 175a, 175b divided by the dividing line. These two regions 175a, 175b are not provided with diffraction grating and are formed as only the glass plate such as a transparent flat plate. Therefore, the light beam input to the circular region travels in straight to radiate the two-divided photodetector 6. The regions 175c, 175d at the outside of the circular regions 175a, 175b of the optical element 175 are provided with prisms. The diffraction grating becomes a factor of error at the time of compensating for imbalance in the amount of light because the amount of light diffracted changes depending on the diffraction efficiency. When the incident light is refracted by the prism, the incident light can be totally input to the photodetector in the opposite side, so compensation accuracy is high.

Figure 15A:
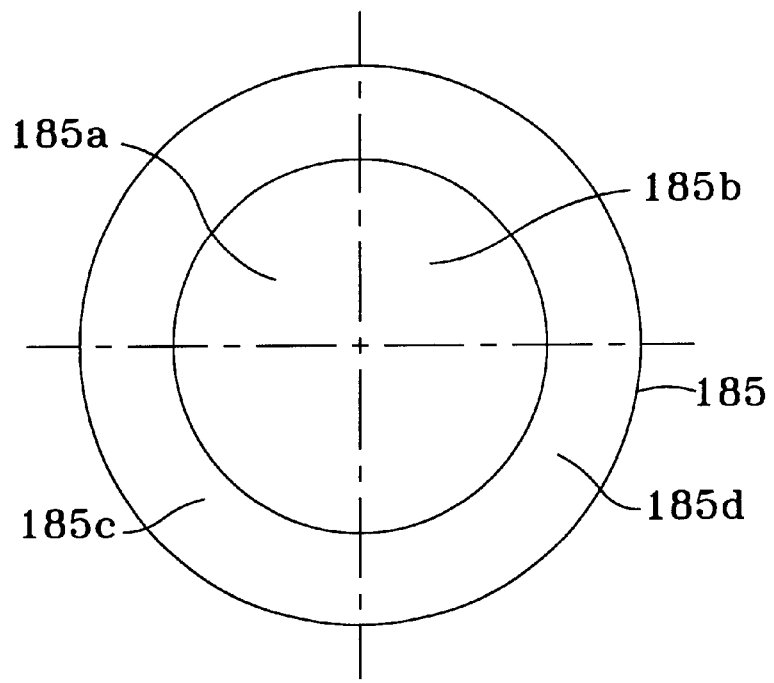
FIGS. 15(a) and 15(b) are diagrams showing another example of the optical element of the present invention.
Figure 15B:
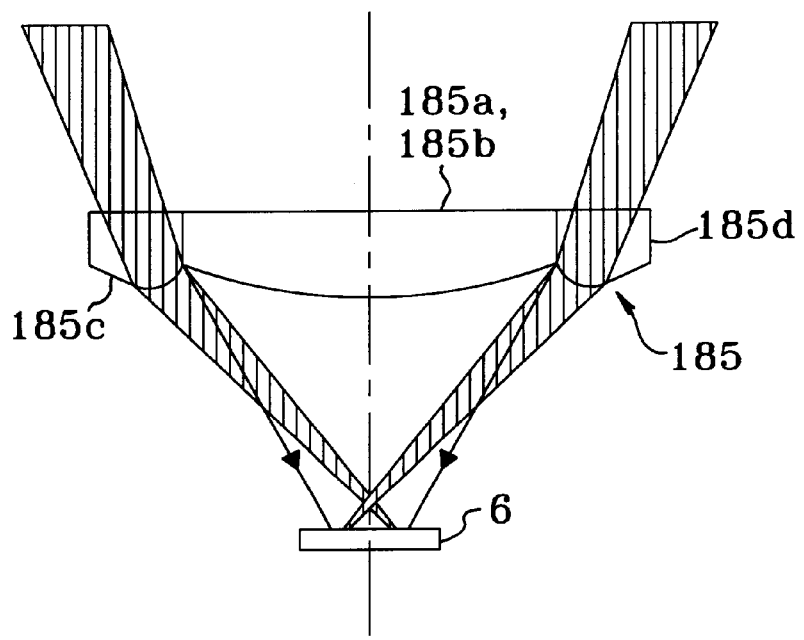

FIG. 15 shows another example of the optical element. FIG. 15(a) shows the optical element viewed from the beam incident direction. FIG. 15(b) shows the light path of the light beam passing the optical element viewed in the lateral direction. In FIGS. 15(a) and 15(b), the optical element 185 is provided with circular lens regions 185a, 185b to which the light beam is condensed. This circular region has a diameter which is equal to or a little smaller than the light beam diameter. This circular region includes a couple of regions 185a, 185b divided by the dividing line. These two regions 185a, 185b are not provided with a diffraction grating. The light beam input to this circular region is further condensed by the circular region to radiate the two-divided photodetector 6. Since the condensed spot size of the light beam input to the photodetector is reduced, the photodetector size can also be reduced. When the area is smaller, the photodetector can assure quicker response and thereby accurate track error signal can be obtained. The regions 185c, 185*d* at the outside of the circular regions 185*a*, 185*b* of the optical system 185 are provided with a lens. This lens is divided into two sections with the dividing line parallel to the dividing line of the two-divided photodetector, and is designed to cause the incident light beam to enter the light receiving section in the opposite side of the dividing line. Namely, this optical element 185 is an element combining a plurality of lenses. According to this embodiment, the problem of the diffraction efficiency can be solved as in the case of the embodiment shown in FIG. 14.

Figure 16A:
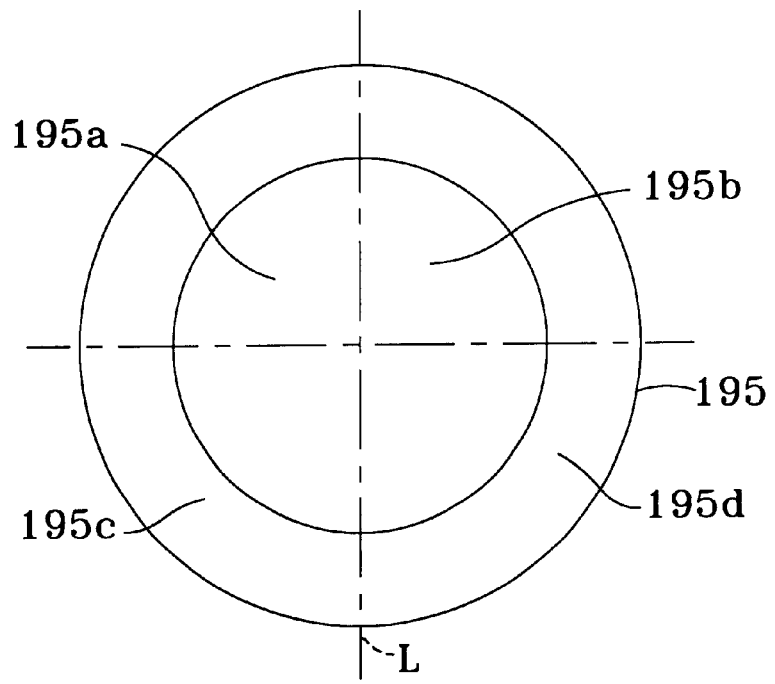
FIGS. 16(a) and 16(b) are diagrams showing yet another example of the optical element of the present invention.
Figure 16B:
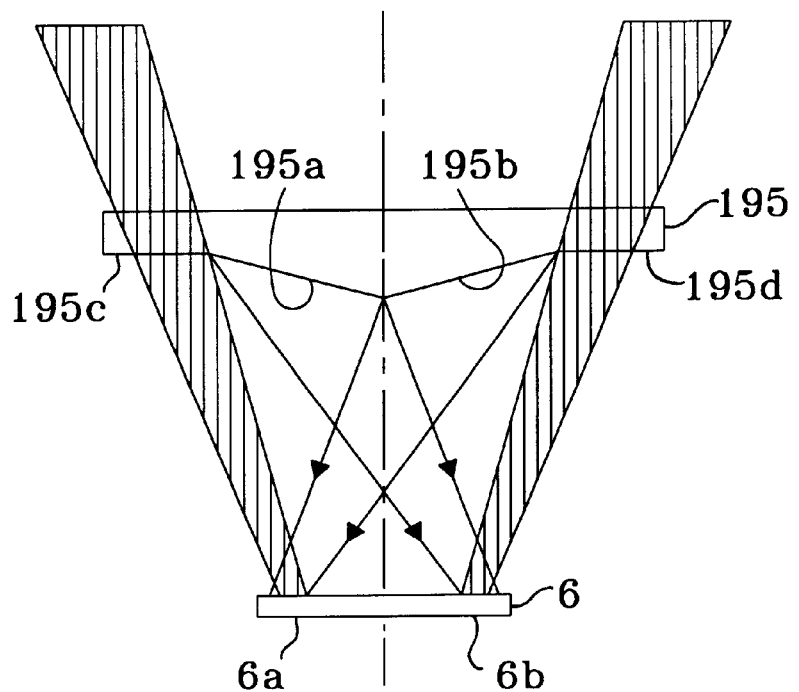

FIG. 16 shows another example of the optical element. FIG. 16(*a*) shows the optical element viewed in the beam incident direction. FIG. 16(*b*) shows the light path of light beam passing the optical system viewed in the lateral direction. In FIGS. 16(*a*) and 16(*b*), the optical element 195 is provided, at its center area, with a couple of conical prisms 195*a*, 195*b*. The external diameter of this circular prism is equal to or a little smaller than the beam diameter of the light beam. These two regions 195*a*, 195*b* are not provided with the diffraction grating. The light beam input to the first conical prism 195*a* is refracted by the conical prism 195*a* to radiate the light receiving section 6*b* of the two-divided photodetector arranged in the opposite side of the dividing line L. The light beam input to the second conical prism 195*b* is refracted by the conical prism 195*b*, in the same manner, and is input to the light receiving section 6*a* arranged on the opposite side of the dividing line. The regions 195*c*, 195*d* at the outside of the two conical prisms 195*a*, 195*b* of the optical element 195 are formed as the flat surface to transmit the light beam. The light beam passing the external side region 195*c* enters the light receiving section 6*a* arranged on the same side as the external region 195*c*. The light beam passing the external region 195*d* enters the light receiving section 6*b* arranged on the same side as the external region 195*d*.

When the optical axis of the objective lens 20 is not deflected from the optical axis of the condensing optical system 8, the light beam condensed by the condenser lens 11*a* passes only the center region of the optical element 195. The light beam having passed the conical prism 195*a* of the optical element 195 enters the light receiving section 6*b* of the two-divided photodetector 6. The light beam having passed the conical prism 195*b* of the optical element 195 enters the light receiving section 6*a* of the two-divided photodetector 6. When the optical axis of the light beam condensed by the condenser lens 11*a* is matched with that of the optical element 195, imbalance due to the optical axis displacement is not generated in amounts of receiving light of the light receiving sections 6*a* and 6*b*. Namely, in this case, both amounts of receiving light are relatively equal.

When the optical axis of the objective lens 20 is deflected from the optical axis of the focusing optical system 8, the optical axis of the light beam condensed by the condenser lens is deflected from the optical axis of the optical element 195. If the optical axis of the light beam is assumed to be deflected in the left direction from the optical axis of the optical element 195, the amount of light passing the conical prism 195*b* is reduced and thereby the amount of receiving light of the light receiving section 6*a* is also reduced. The amount of receiving light of the light receiving section 6*a* is relatively reduced in comparison with the amount of receiving light of the light receiving section 6*b*. Here, since the light beam does not pass the flat plate region 195*d*, the amount of receiving light is never added to the light receiving section 6*b*. Since a part of the light beam passes the flat plate region 195*c*, the amount of the receiving light of a part of the light beam is added to the light receiving section 6*a*. The amount of receiving light of the light receiving section 6*a* relatively increases in comparison with the amount of receiving light of the light receiving section 6*b*. Therefore, the amount of receiving light of the light receiving section 6*a* increases to correct imbalance in the amounts of receiving light of the light receiving sections 6*a*, 6*b*.

Namely, in this embodiment, the light beam passing the center region of the optical element 195 is changed in the direction to be received by the light receiving section on the opposite side of the dividing line. Meanwhile, the light passing the external region of the optical element 195 is never changed in the direction to be received by the light receiving section on the same side of the dividing line.

Figure 17A:
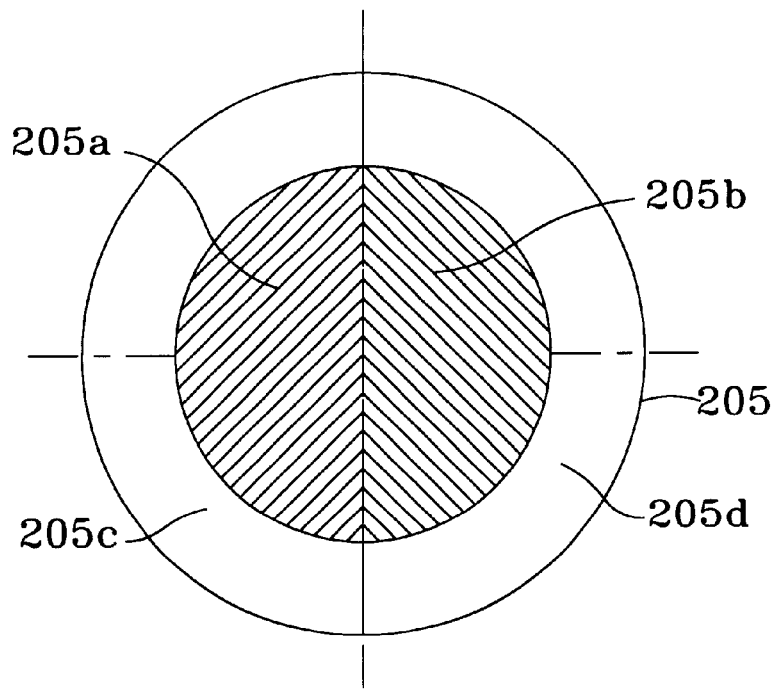
FIGS. 17(a) and 17(b) are diagrams showing still another example of the optical element of the present invention.
Figure 17B:
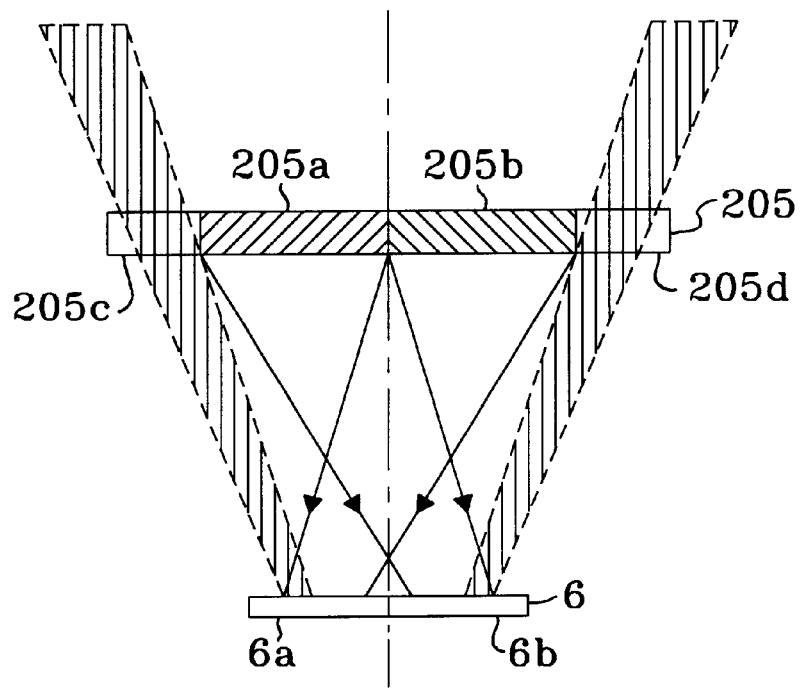

FIG. 17 shows still another example of the optical element. FIG. 17(*a*) shows the optical element viewed from the beam incident direction. FIG. 17(*b*) shows the optical path, viewed from the lateral direction, of the light beam passing the optical element. In FIGS. 17(*a*) and 17(*b*), the optical element 205 is provided, at its center area, with a couple of diffraction gratings 205*a*, 205*b*. The external diameter of this diffraction grating is equal to or a little smaller than the diameter of the light beam passing the optical element 205. The light beam input to the first diffraction grating 205*a* is diffracted by the first diffraction grating 205*a* and enters the light receiving section 6*b* of the two-divided photodetector arranged in the opposite side of the dividing line L. The light beam input to the second diffraction grating 205*b* is also diffracted by the second diffraction grating 205*b* and enters the light receiving section 6*a* arranged in the opposite side of the dividing line L. The external regions 205*c*, 205*d* of the two diffraction gratings 205*a*, 205*b* of the optical element 205 are formed as the flat surfaces allowing the light beam to pass. The light beam passing this external region 205*c* also enters the light receiving section 6*a* arranged in the same side as the external region 205*c*. The light beam passing the external region 205*d* enters the light receiving section 6*b* arranged in the same side as the external region 205*d*.

When the optical axis of the objective lens 20 is not aligned with that of the condensing optical system 8, the light beam condensed by the condenser lens 11*a* passes only the center area of the optical element 205. The light beam having passed the diffraction grating 205*a* of the optical element 205 enters the light receiving section 6*b* of the two-divided photodetector 6. The light beam having passed the diffraction grating 205*b* of the optical element 205 enters the light receiving section 6*a* of the two-divided photodetector 6. When the optical axis of light beam condensed by the condenser lens 11*a* is aligned with the optical axis of the optical element 205, imbalance by optical axis displacement is not generated in the amounts of receiving light of the light receiving sections 6*a* and 6*b*. Namely, in this case the amounts of receiving light are relatively equal.

When the optical axis of the objective lens 20 is deflected from the optical axis of the condensing optical system 8, the optical axis of the light beam condensed by the condenser lens is deflected from that of the optical element 205. If the optical axis of the light beam is deviated in the left direction from the optical axis of the optical element 205, the amount of receiving light passing the diffraction grating 205*b* is reduced and thereby the amount of receiving light of the light receiving section 6*a* is also reduced. The amount of receiving light of the light receiving section 6*a* is relatively lower in comparison with the amount of receiving light of the light receiving section 6*b*. Here, since the light beam does not pass the flat plate region 205*d*, the amount of receiving light is never added to the light receiving section 6b. Since a part of the light beam passes the flat plate region 205c, the amount of receiving light of a part of the light beam is added to the light receiving section 6a. The amount of receiving light of the light receiving section 6a relatively increases in comparison with the amount of receiving light of the light receiving section 6b. Therefore, the amount of receiving light of the light receiving section 6a increases to correct imbalance in the amount of receiving light of the light receiving sections 6a, 6b. Accordingly, track error signal offset can be eliminated.

Figure 18A:
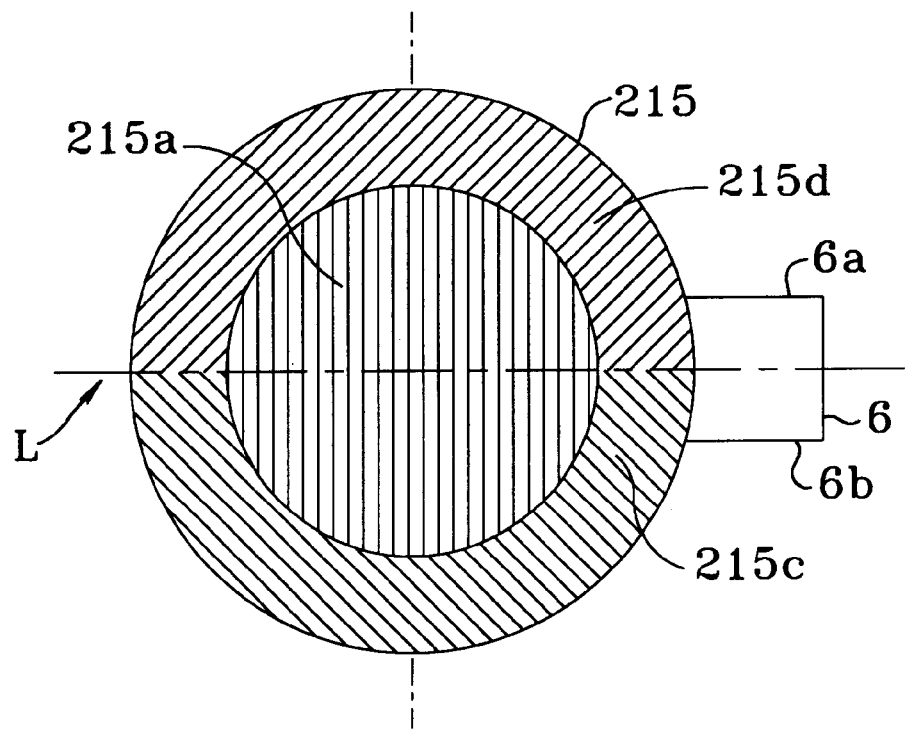
FIGS. 18(a) and 18(b) are diagrams showing another example of the optical element of the present invention.
Figure 18B:
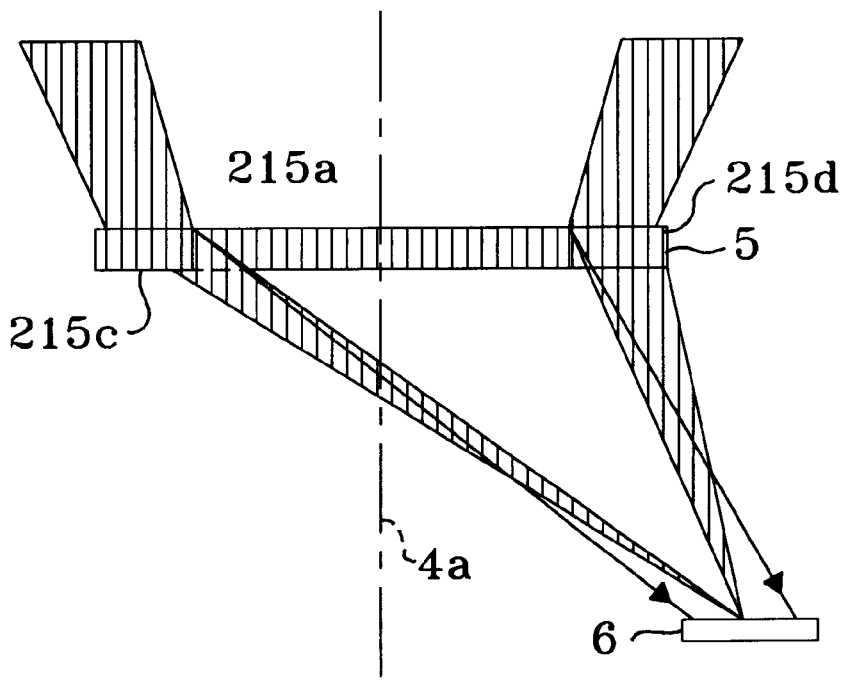

FIG. 18 shows yet another example of the optical element. FIG. 18(a) shows the optical element viewed from the beam incident direction. FIG. 18(b) shows the light path, viewed from the lateral direction, of the light beam passing the optical element. In FIGS. 18(a) and 18(b), the optical element 215 is provided, at its center area, with a first circular diffraction grating 215a. The external diameter of this diffraction grating is equal to or a little smaller than the diameter of the light beam passing the optical element 215. The two-divided photodetector 6 is provided, along the dividing line L, at the position shifted in the right direction of the figure from the optical axis of the optical element 215. The first diffraction grating 215a changes the direction of the light path of the light beam, to be input to the first diffraction grating 215a, to enter the two-divided photodetector 6. The optical element 215 is provided, at the external region of the first diffraction grating 215a, with the second and third diffraction gratings 215c, 215d. The second diffraction grating 215c changes the direction of the light path of the light beam passing the second diffraction grating 215c so that this light beam enters the light receiving section 6a arranged in the opposite side of the dividing line L for the second diffraction grating 215c. The third diffraction grating 215d changes the direction of light path of the light beam passing the third diffraction grating 215d so that this light beam enters the light receiving section 6b arranged in the opposite side of the dividing line L for the third diffraction grating 215d.

When the optical axis of the objective lens 20 is aligned with the optical axis of the condensing optical system 8, the light beam condensed by the condenser lens 11a passes only the center area of the optical element 215. Since the optical axis of the light beam condensed by the condenser lens 11a is aligned with the optical axis of the optical element 215, the light beam having passed the diffraction grating 215a of the optical element 215 equally enters the light receiving sections 6a, 6b of the two-divided photodetector 6. The light beam enters the two-divided photodetector 6 so that the optical axis of condensed spot formed on the two-divided photodetector 6 is located on the dividing line of the two-divided photodetector 6.

When the optical axis of the objective lens 20 is deflected from the optical axis of the condensing optical system 8, the optical axis of the light beam condensed by the condenser lens is deviated from that of the optical element 215. If the optical axis of the light beam is assumed to be deviated in the lower direction in the figure from the optical axis of the optical element 215, the condensed spot formed on the two-divided photodetector 6 is shifted in the lower direction in the figure. Since the focusing position of the condensed spot is shifted in the lower direction, the amount of receiving light of the light receiving section 6a is relatively reduced compared with the amount of the light receiving section 6b. Here, the light beam does not pass the third diffraction grating 215d and therefore the amount of receiving light is never added to the light receiving section 6b. Meanwhile, since a part of the light beam passes the second diffraction grating 215c, the amount of receiving light of a part of this light beam is added to the light receiving section 6a. The amount of receiving light of the light receiving section 6a relatively increases in comparison with the amount of receiving light of the light receiving section 6b. Therefore, the amount of receiving light of the light receiving section 6a increases to correct imbalance in the amount of receiving light of the light receiving sections 6a and 6b. Accordingly, the track error signal offset can be eliminated. According to the present embodiment, the two-divided photodetector may be arranged in the desired position. Considering the arrangement position of the two-divided photodetector, the diffracting direction of the diffraction grating to be provided in the optical element can be set.

Figure 19:
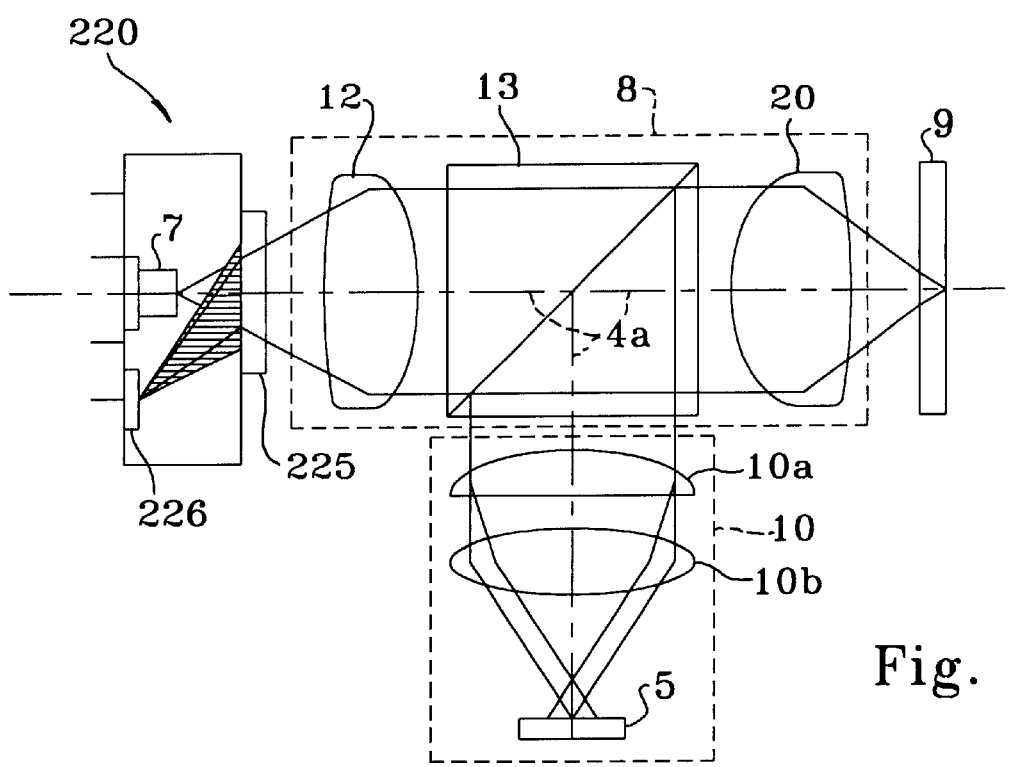
FIG. 19 is a diagram showing a still further example of the optical disk apparatus of the present invention.

FIG. 19 shows another example of the optical disk apparatus. In FIG. 19, the light beam emitted from the light source 7 is converted to the parallel coherent light beam by the collimator lens 12. This coherent light beam passes the beam splitter 13 and is then focused by the objective lens 20. The focused light beam illuminates the disk 9. The objective lens 20 forms a light beam spot on the disk 9. This disk 9 is an optical disk on which many information tracks or other targets are formed. In FIG. 19, the optical system including the collimator lens 12, beam splitter 13 and objective lens 20 is called the focusing optical system 8. The light beam focused on the recording surface of the disk 9 is reflected by the recording surface. Moreover, this light beam is diffracted depending on the information recorded on the disk 9. The reflected light beam is recovered to the parallel light when it passes the objective lens 20. Thereafter, the reflected light beam is bent, in its light path, by 90 degrees by the beam splitter 13. The light beam, of which the light path direction is changed, enters the optical system 10 for focus error detection.

The focus error detecting optical system 10 includes the four-divided photodetector 5, optical element 10a providing an asymmetrical condensed light beam spot, and condenser lens 10b condensing the light beam on the four-divided photodetector 5. The optical element 10a is cylindrical lens to introduce asymmetrical spot shape on the photodetector 5. The focus error detecting method is called the astigmatism method. As the focus error detecting method, various detecting methods other than the astigmatism method can be applied. For example, as the focus error detecting method, the Foucault method as shown in FIG. 6.

The light beam, having changed its direction with the beam splitter 13, is divided by another beam splitter, not illustrated, arranged between the beam splitter 13 and focus error detecting optical system 10, into one light beam entering the reproducing optical system (not illustrated) for reproducing the information recorded on the disk 9, and another light beam entering the optical system 10. This reproducing optical system is structured by including, as shown in FIG. 6, the Wollaston prism 126, condenser lens 130 and two-divided photodetector 132 for magneto-optical detection. In this case, the disk 9 is a 3.5 inch magneto-optical disk medium conforming to the ISO format.

The optical system for tracking error detection to detect deviation between the light beam spot formed by the objective lens 20 and track on the disk 9 is structured by including the condensing optical system 8 and a package 220. The package 220 includes a light source 7 formed of a semiconductor laser, a two-divided photodetector 226 for detecting tracking error and an optical element 225. The two-divided photodetector 226 and optical element 225 are structured in the same manner as the optical element 215 and two-divided photodetector 6 as shown in FIG. 18. This optical element 225 is provided, at its center area, with the first circular diffraction grating 215a. The first diffraction grating 215a causes the light beam passing the first diffraction grating 215a to enter the light receiving sections 6a, 6b of the two-divided photodetector 6. When the optical axis of the light beam is aligned with the optical axis of the focusing optical system 8, the first diffraction grating 215a causes the diffracted light beam to enter the two-divided photodetector 6 so that the optical axis of the condensed spot formed on the two-divided photodetector 6 is located on the dividing line of the two-divided photodetector 6. The optical element 215 is provided with the second and third diffraction gratings 215c and 215d in the external region of the first diffraction grating 215a. The second diffraction grating 215c changes the direction of the light path of the light beam passing the second diffraction grating 215c so that the light beam enters the light receiving section 6a arranged in the opposite direction of the dividing line L for the second diffraction grating 215c. The third diffraction grating 215d changes the direction of the light path of the light beam passing the third diffraction grating 215d so that the light beam enters the light receiving section 6b arranged in the opposite side of the dividing line L for the third diffraction grating 215d.

The light beam emitted from the semiconductor laser 7 travels in straight when it is not diffracted at the time of passing the optical element 225. The light beam reflected by the disk 9 is condensed on the two-divided photodetector 226 by the collimator lens 12.

On the magneto-optical disk medium 9, tracks and grooves are alternately formed. The light beam diffracted by the groove on the disk 9 enters the two-divided photodetector 226 via the focusing optical system 8. The two-divided photodetector 226 detects, using the known push-pull method, deviation between the track center and a beam spot formed on the disk 9.

According to the present embodiment, the two-divided photodetector 226 is not always required to be arranged on the optical axis 4a. Therefore, the light source 7 and two-divided photodetector photodetector 226 can be arranged on the same plane. Accordingly, the light source 7 and two-divided photodetector 226 can be mounted at the bottom surface of the package 220, and the electric circuits used for the light source 7 and two-divided photodetector 226 can be integrated. In addition, since the beam splitter for polarizing the light beam for tracking error detection is no longer required, the optical apparatus can be reduced in size and can be formed at a low cost. Moreover, the loss of the amount of light of the light beam does not happen when it passes the beam splitter. Moreover, since the optical element 225 can be attached to the package 220, the structure of the optical system for tracking error detection can be simplified. In addition, since the light beam used for track error detection is the diffracted light beam, when the space frequency of all diffraction gratings forming the optical element is set equally, the diffraction efficiency can also be set equally, and thereby calculation for obtaining the amount of receiving light can also be simplified.

Figure 20A:
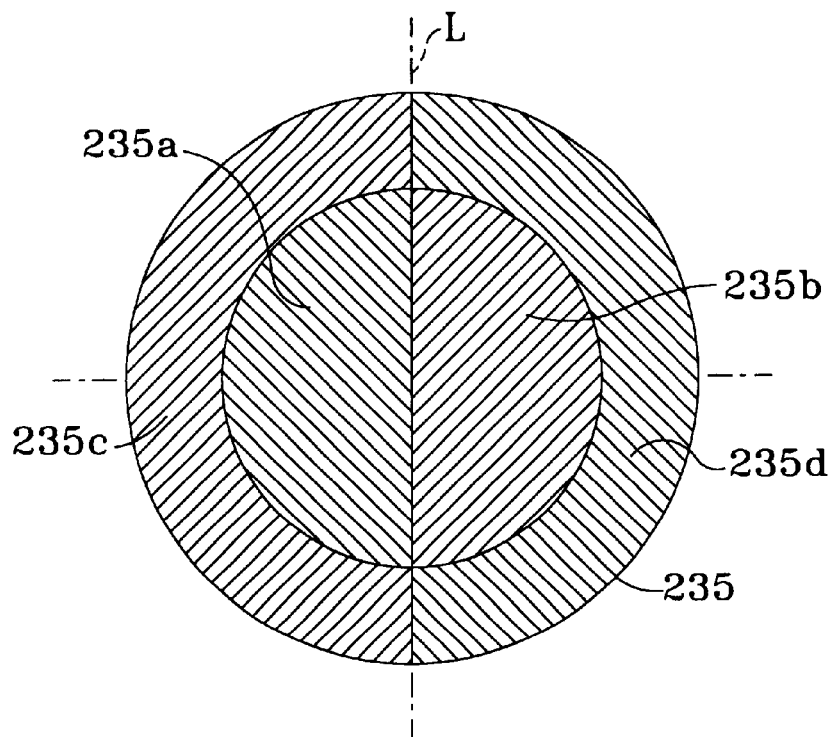
FIGS. 20(a) and 20(b) are diagrams showing another example of the optical apparatus of the present invention.
Figure 20B:
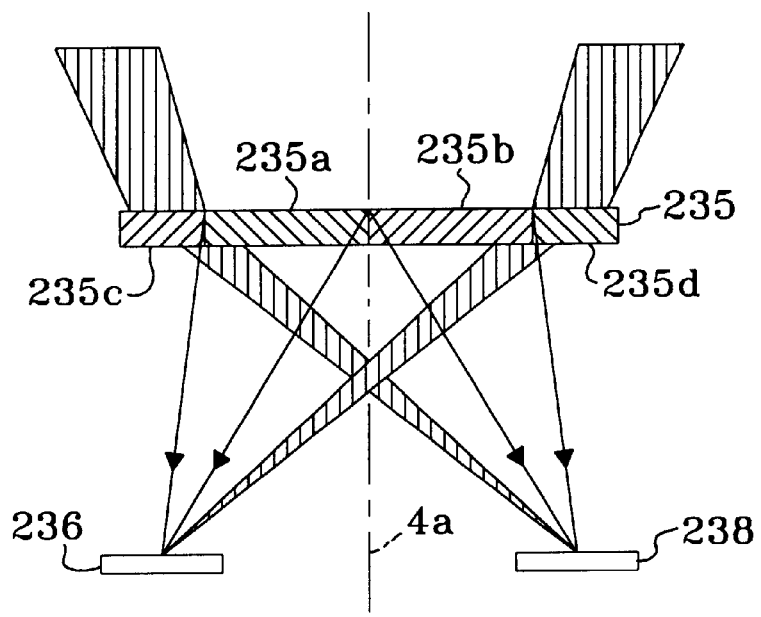

FIG. 20 shows another example of the optical apparatus. FIG. 20(a) shows the optical element viewed from the light beam incident direction. FIG. 20(b) shows the light path of light beam passing the optical element viewed from the lateral direction. In FIGS. 20(a) and 20(b), the optical element 235 is provided, at its center area, with a circular diffraction grating. The external diameter of this diffraction grating is equal to or a little smaller than the beam diameter of the light beam passing the optical element 235. This diffraction grating is formed of the first and second diffraction gratings 235a, 235b. The first and second diffraction gratings 235a, 235b are divided with the dividing line L which is parallel to the track direction. A couple of photodetectors 236, 238 are arranged in symmetrical positions with respect to the dividing line. The first diffraction grating 235a changes the direction of the light path of the light beam so that the light beam to be input to the first diffraction grating 235a enters the photodetector 236. The second diffraction grating 235b changes the direction of the light path of the light beam so that the light beam to be input to the second diffraction grating 235b enters the photodetector 238. The optical element 235 is provided with the third and fourth diffraction gratings 235c, 235d at the external regions of the first and second diffraction gratings 235a, 235b. The third diffraction grating 235c changes the direction of the light path of the light beam passing the third diffraction grating 235c so that the light beam enters the photodetector 238 arranged in the opposite side of the dividing line L for the third diffraction grating 235c. The fourth diffraction grating 235d changes the direction of the light path of the light beam passing the fourth diffraction grating 235d so that the light beam enters the photodetector 236 arranged in the opposite side of the dividing line L (or optical axis 4a) for the fourth diffraction grating 235d.

Figure 21:
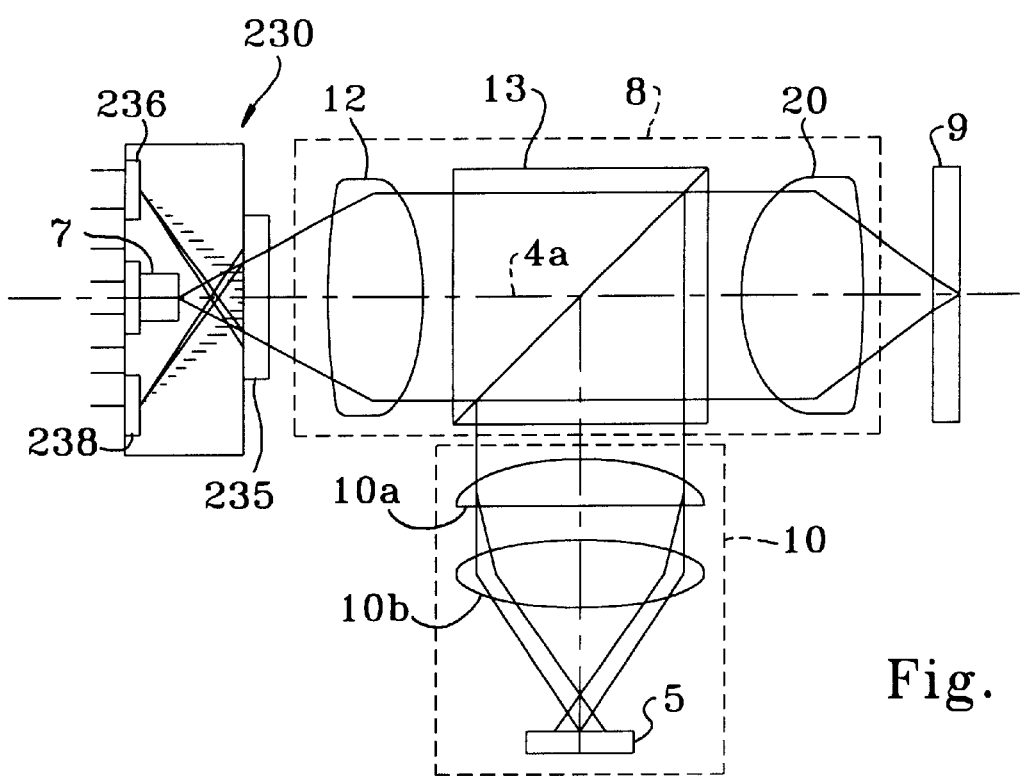
FIG. 21 is a diagram showing a structure of optical disk apparatus with the optical apparatus shown in FIG. 20.

FIG. 21 shows the structure of the optical disk apparatus in the optical apparatus shown in FIG. 20. In FIG. 21, the light beam emitted from the light source 7 is converted to the parallel light beam by the collimator lens 12. This coherent light beam passes the beam splitter 13 and is then focused by the objective lens 20. This focused light beam illuminates the disk 9. The objective lens 20 forms a light beam spot on the disk 9. This disk 9 is an optical disk on which many information tracks or other target are formed. In FIG. 21, the optical system structured by including the collimator lens 12, beam splitter 13 and objective lens 20 is called the focusing optical system 8. The light beam focused on the recording surface of the disk 9 is reflected by the recording surface. Moreover, this light beam is diffracted depending on the information recorded on the disk 9. The reflected light beam is recovered as the parallel light beam when it passes the objective lens 20. Thereafter, the reflected light beam is bent, in this light path, by 90 degrees by the beam splitter 13. The light beam of which the light path direction is changed is input to the optical system 10 for focus error detection.

The focus error detecting optical system 10 is structured by including a four-divided photodetector 5, an optical element 11a for giving an asymmetrical characteristic to the condensed light beam spot, and a condenser lens 10b for condensing the light beam on the four-divided photodetector 5. The optical element 10a is cylindrial lens to be applied astigmatism method as the focus error detecting system.

The light beam, which is changed in its direction by the beam splitter 13, is divided into one light beam to enter the reproducing optical system (not illustrated) to reproduce the information recorded on the disk 9, and another light beam to enter the optical system 10 by the beam splitter, not illustrated, arranged between the beam splitter 13 and the focus error detecting optical system 10.

The tracking error detecting optical system to detect deviation between the light beam spot formed by the objective lens 20 and the track on the disk 9 is structured by including the focusing optical system 8 and a package 230. The package 230 includes a light source 7 formed of the semiconductor laser, a couple of photodetectors 236, 238 for detecting tracking error and an optical element 235. These two photodetectors 236, 238 and optical element 235 form the optical apparatus as shown in FIG. 20.

The light beam emitted from the semiconductor laser 7 travels in straight when it is not diffracted at the time of passing the optical element 235. The light beam reflected by the disk 9 passes the focusing optical system 8 and is then condensed by the collimator lens 12. The condensed light beam goes to the package 230.

The light beam condensed by the collimator lens 12 is diffracted, when it passes the optical element 235, by the first and second diffraction gratings 235a, 235b and then enters the photodetectors 236, 238. A differential output of the two photodetectors 236, 238 is output as the tracking error signal indicating deviation between the track center and beam spot formed on the disk 9 by the objective lens 20.

When the optical axis of the objective lens 20 is aligned with the optical axis of the condensing optical system 8, the light beam condensed by the collimator lens 12 passes only the circular region formed by the first and second diffraction gratings 235a, 235b of the optical element 235. The light beam having passed the first and second diffraction gratings 235a, 235b of the optical element 235 enters a couple of photodetectors 236, 238 providing an equal amount of receiving light.

When the optical axis of the objective lens 20 is deflected from the optical axis of the focusing optical system 8, the optical axis 4a of the light beam condensed by the collimator lens is also deflected from the optical axis of the optical element 235. When it is assumed that the optical axis 4a of the light beam is deviated to the lower direction in the figure from the optical axis of the optical element 235, the amount of the receiving light beam passing the first diffraction grating 235a is reduced and thereby the amount of receiving light of the photodetector 236 is also reduced. Namely, the amount of receiving light of the photodetector 236 is relatively reduced in comparison with the amount of receiving light of the photodetector 238. Here, since the light beam does not pass the third diffraction grating 235c, the amount of receiving light is never added to the photodetector 238. Meanwhile, since a part of the light beam passes the fourth diffraction grating 235d, the amount of receiving light of a part of the light beam is added to the photodetector 236. The amount of receiving light of the photodetector 236 relatively increases in comparison with the amount of receiving light of the photodetector 238. Therefore, the amount of receiving light of the photodetector 236 increases, and then imbalance in the amount of receiving light of the photodetectors 236 and 238 is corrected. Thereby, the track error signal offset can be eliminated.

In this embodiment, the effect similar to that of the optical disk apparatus shown in FIG. 19 can be obtained. Moreover, since the two-divided photodetector of the embodiment shown in FIG. 19 must be provided to result in alignment of the optical axis of the light beam and the dividing line, the working time becomes longer. On the other hand, this embodiment can independently provide the two photodetectors 236, 238, so it is simplified in its installation work.

Figure 22A:
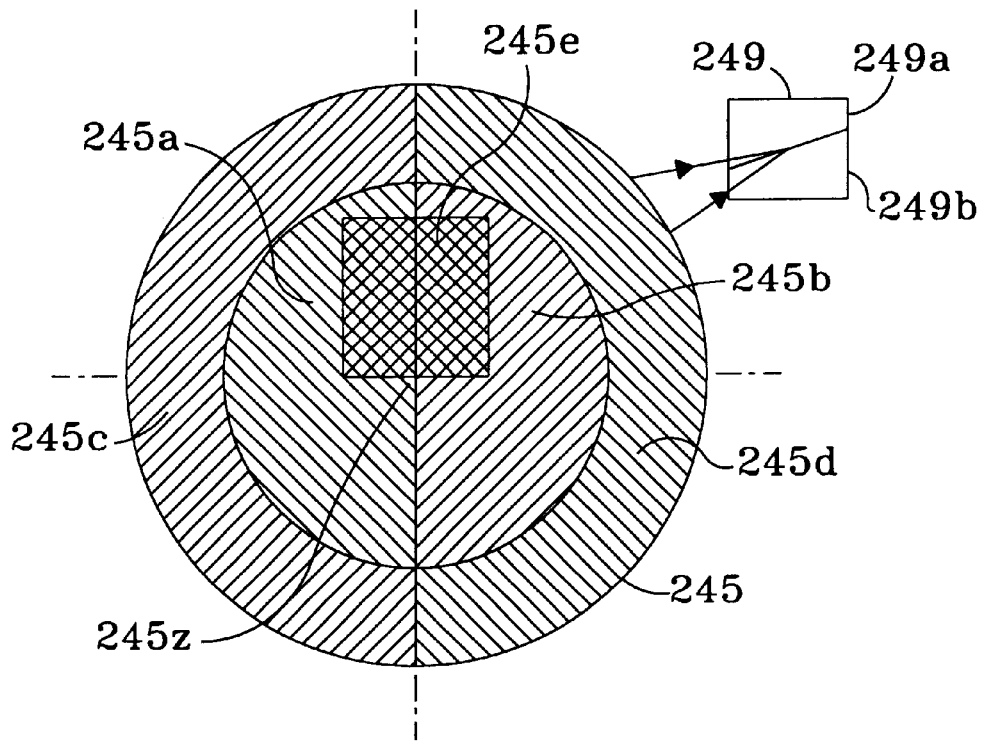
FIGS. 22(a) and 22(b) are diagrams showing another example of the optical element of the present invention.
Figure 22B:
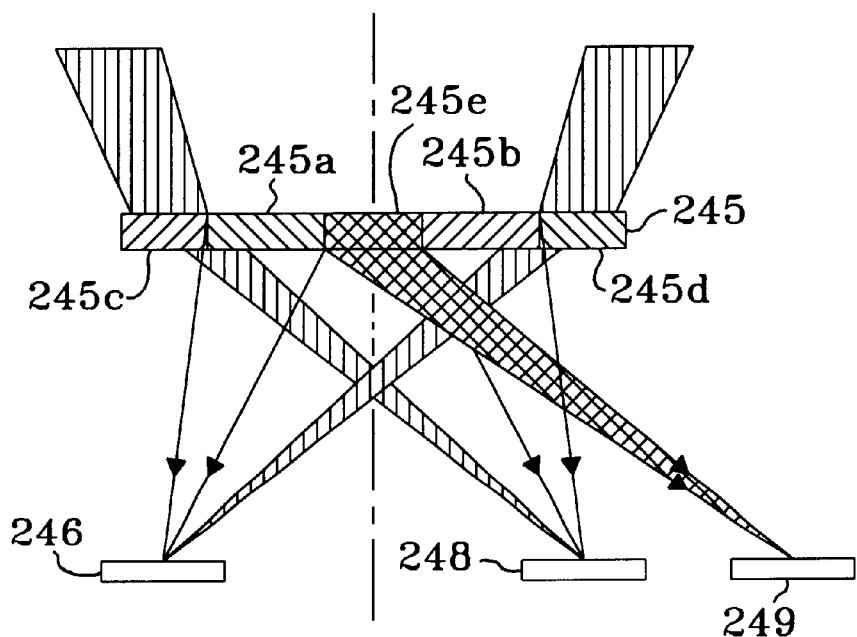

FIG. 22 shows another example of the optical apparatus. FIG. 22(a) shows an optical element viewed from the beam incident direction. FIG. 22(b) shows the light path of the light beam passing the optical element. In FIGS. 22(a) and 22(b), the optical element 245 is structured by including five diffraction gratings. The first and second diffraction gratings 245a, 245b are divided into a couple of sections by the dividing line L parallel to the track direction. A couple of photodetectors 246, 248 are arranged in the line in symmetrical positions with respect to the dividing line. The first diffraction grating 245a changes the direction of the light path of the light beam so that the light beam to be input to the first diffraction grating 245a enters the photodetector 246. The second diffraction grating 245b changes the direction of the light path of the light beam so that the light beam to be input to the second diffraction grating 245b enters the photodetector 248. The first and second diffraction gratings 245a, 245b form the circular region. The first and second diffraction gratings 245a, 245b correspond to the first diffraction grating previously described.

This optical element 245 is provided, at the external regions of the first and second diffraction gratings 245a, 245b, with the third and fourth diffraction gratings 245c, 245d. The third diffraction grating 245c changes direction of light path of the light beam passing the third diffraction grating 245c so that the light beam enters the photodetector 248 arranged in the opposite side of the dividing line L for the third diffraction grating 245c. The fourth diffraction grating 245d changes the direction of the light path of the light beam passing the fourth diffraction grating 245d so that the light beam enters the photodetector 246 arranged in the opposite side of the dividing line L (or optical axis 4a) for the fourth diffraction grating 245d. These third and fourth diffraction gratings 245c, 245d correspond to the second diffraction grating previously described.

The fifth diffraction grating 245e is provided to detect focus error. The two-divided photodetector 249 is arranged in the same plane as the photodetectors 246, 248. The fifth diffraction grating 245e causes the light beam passing the fifth diffraction grating 245e to enter the two-divided photodetector 249. This fifth diffraction grating 245e corresponds to the third diffraction grating previously described. These first to fifth diffraction gratings 245a to 245e have gratings of different shapes resulting in different stripe patterns.

Figure 23:
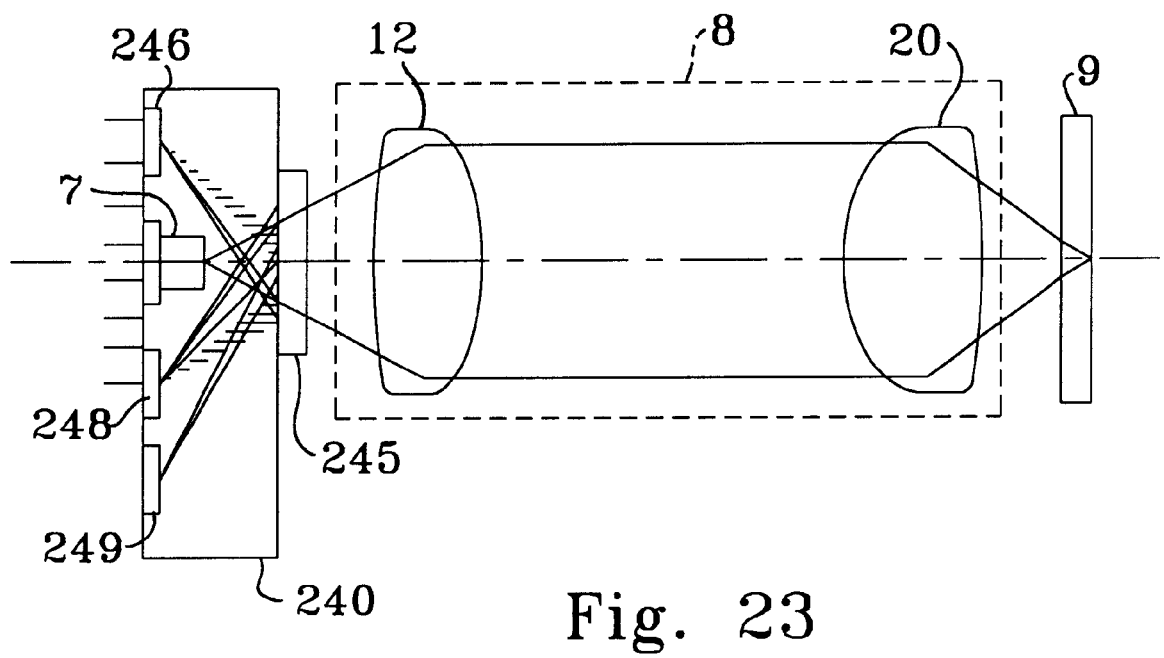
FIG. 23 is a diagram showing a structure of an optical disk apparatus with the optical element shown in FIGS. 22(a) and 22(b)

FIG. 23 shows a structure of the optical disk apparatus provided with the optical apparatus shown in FIG. 22. In FIG. 23, the light beam emitted from the light source 7 is converted to a parallel light beam by the collimator lens 12. The light source 7 formed of a semiconductor laser is mounted on the bottom surface of the housing of the package 240. The optical element 245 is mounted at the position on the housing opposed to the collimator lens 12. A couple of photodetectors 246, 248 and two-divided photodetector 249 are fixed on the bottom surface of the housing in which the semiconductor laser 7 is mounted. Therefore, a plurality of diffraction gratings 245a to 245e forming the optical element 245 are arranged between the collimator lens 12 corresponding to the optical system or condenser lens and the photodetector.

This coherent light beam is focused by the objective lens 20. The condensed light beam illuminates the disk 9. In FIG. 23, the focusing optical system 8 is structured by including the collimator lens 12 and objective lens 20. The beam splitter is not provided in this focusing optical system 8. The condensing optical system not including the beam splitter is formed in very small size and therefore the optical disk apparatus using this focusing optical system 8 can also be formed in small size.

Deviation between the light beam spot formed by the objective lens 20 and track on the disk 9 can be detected in the same manner as the optical apparatus shown in FIG. 20 or the optical disk apparatus shown in FIG. 21. Namely, the optical apparatus structured by the first and second diffraction gratings 245a, 245b provided in the optical element 245 and a couple of photodetectors 246, 248 has the same function as the optical apparatus shown in FIG. 20. Therefore, a differential output of a couple of photodetectors 246, 248 becomes the tracking error signal from which offset can be eliminated.

When the objective lens 20 moves in the direction to be isolated from the disk 9, the light spot on the two-divided photodetector 249 moves in the direction to come close to the optical axis 245z of the optical element 245 on the two-divided photodetector 249. When the objective lens 20 moves in the direction to come close to the disk 9, the light spot on the two-divided photodetector 249 moves in the direction to be isolated from the optical axis 245z of the optical element 245 on the two-divided photodetector 249. Focus error can be detected by detecting movement of this light spot with the two-divided photodetector 249.

The first and second diffraction gratings 245a, 245b forming the circular region have a diameter which is equal to or a little smaller than the beam diameter of the light beam passing the optical element 245. When the objective lens 20 is displaced by about 200 μm from the center 4a of the light beam of the objective lens 20, the light beam is deviated by about 60 μm from the center 4a of the light beam on the optical element 245. Moreover, the radius of the light beam is 475 μm at the areas where the light beam enters the optical element 245. In this case, the radius of the circular region is set to 460 μm. Namely, the radius of this circular region is reduced by 15 μm from the radius of the light beam. The diameter of this circular region should preferably be a little smaller than the diameter of the light beam. However, the diameter of this circular region is not required to be smaller than the diameter of the light beam in a degree equal to or larger than deviation of the light beam. Here, this light beam does not include Gaussian distribution. The skirt portion of the Gaussian distribution of the light beam is cut by the collimator lens 12.

In this embodiment, the light source, tracking error detector and focus error detector can be integrally housed in the package, to further promote reduction in size and low price of the optical apparatus.

In this embodiment, the fifth diffraction grating 245e is formed in the region where it is not easily influenced by change of intensity of the light beam due to diffraction of the light. As will be apparent from FIG. 2, intensity change on the dividing line is smaller than intensity change in the region isolated from the dividing line. Since the fifth diffraction grating 245e is integrated to the optical element 245, the intensity of the push-pull signal is rather intensified, to result in a stable track error signal.

In the embodiments of FIGS. 19, 21 and 23, the collimator lens corresponds to the condenser lens. Moreover, in the embodiments of FIGS. 19, 21 and 23, it is of course possible that the optical elements 225, 235 and 245 may be provided in the light path through which the reflected light beam divided by the beam splitter 13 passes.

Figure 24:
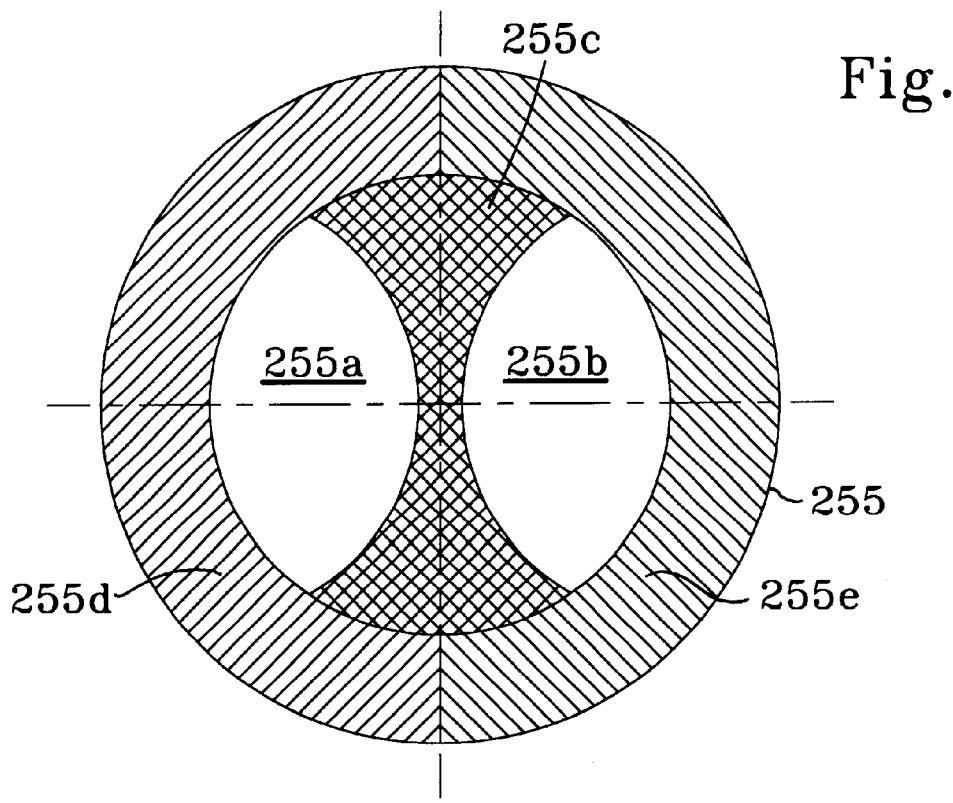
FIG. 24 is a diagram showing another example of the optical element of the present invention.

FIG. 24 shows yet another example of the optical element. In FIG. 24, an optical element 255 is provided, at its center area, with a circular region. This circular region includes a couple of regions 255a, 255b divided by the dividing line. This circular region has a diameter which is equal to or a little smaller than the diameter of the light beam. These two regions 255a, 255b are transmitting regions causing the light beam to travel in straight. These two regions 255a, 255b are not provided with diffraction gratings and are only transparent flat glass plates. The light beam entering these regions 255a, 255b runs in straight to radiate the two-divided photodetector (not illustrated) 136. This circular region is provided with a shielding region 255c. This shielding region 255c is coated with a black paint. The light beam does not pass through this shielding region 255c. The optical element 255 is also provided, at the external side of the circular region, with the first and second diffraction gratings 255d, 255e. The first and second diffraction gratings have the same functions as the diffraction gratings 145c, 145d shown in FIG. 7. Therefore, the first and second diffraction gratings 255d, 255e may be formed of the prism or lens shown in FIG. 14 or FIG. 15.

The shielding region 255c shields the part not overlapping the primary diffracted element among the $0^{th}$ reflected beam element of the light reflected from the disk. As is apparent from FIG. 2, at the center area of the light beam where the mirror-reflected light beam and the primary diffracted light beam do not overlap with each other, the intensity of the light beam almost does not change even if track deviation exists. The light beam of this region is not only unnecessary for detection of the push-pull signal, but also causes the amplitude of the push-pull signal to be reduced.

The shielding region 255c increases the amplitude of the push-pull signal. When the bias element generated in the push-pull signal is equal owing to optical axis displacement of the objective lens, since offset of the push-pull signal having a higher amplitude becomes smaller than that of the push-pull signal having a lower amplitude, this shielding region 255c is preferable for elimination of offset of the push-pull signal.

Figure 25:
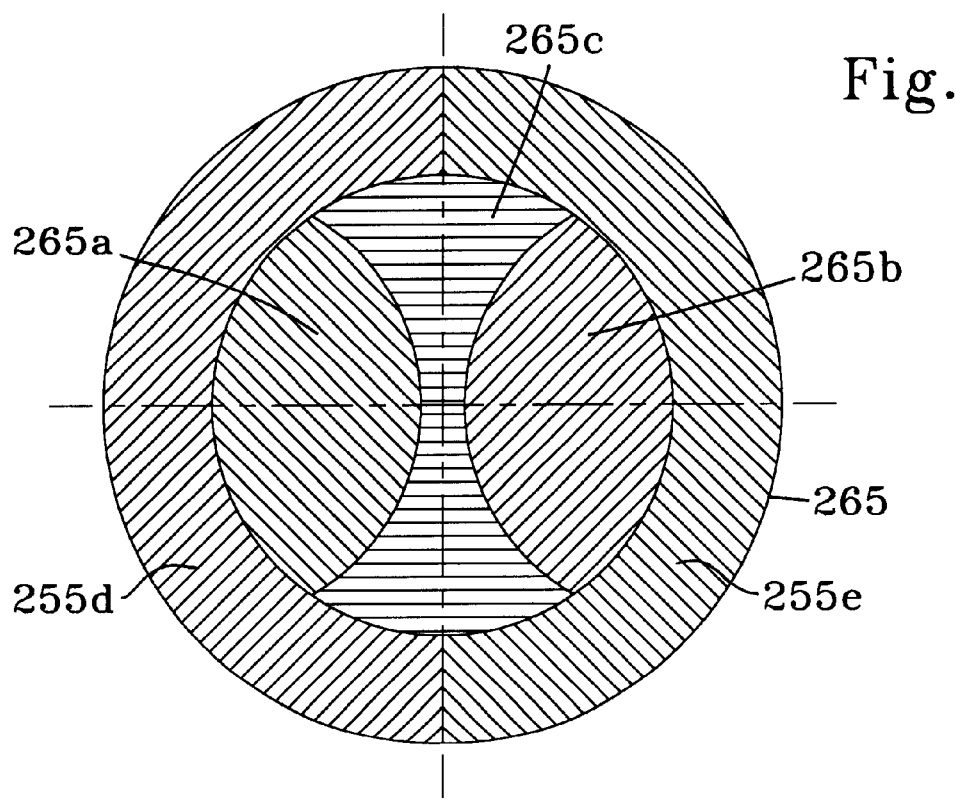
FIG. 25 is a diagram showing still another example of the optical element of the present invention.

FIG. 25 shows still another example of the optical element. In FIG. 25, an optical element 265 is provided with the regions in the same number as the optical elements 255 shown in FIG. 24. The five regions provided in the optical element 265 are formed in the same shape as the five regions of the optical element 255. The optical element 265 is provided, in its center region, with a circular region. This circular region has a diameter which is equal to or a little smaller than the beam diameter of the light beam. This circular region includes a couple of regions 265a, 265b divided by the dividing line. This circular region is provided with a first diffraction grating 265a and a second diffraction grating 265b. The first and second diffraction gratings 265a, 265b have the same functions as that of the optical elements shown in FIGS. 18 to 23. Namely, the first and second diffraction gratings 265a, 265b polarize the optical axis 4a of the light beam passing the first and second diffraction gratings 265a, 265b, causing the light beam to enter the photodetector located at the position shifted from the optical axis 4a. The optical element 265 is provided with the third diffraction grating 265c between the first and second diffraction gratings 265a, 265b. In the region where the third diffraction grating 265c is formed, the primary diffracted element of the $0^{th}$ reflected element at the center of the light beam reflected from the disk 9 is not overlapped. The optical element 265 is provided with the fourth and fifth diffraction gratings 265d, 265e at the external regions of the first, second and third diffraction gratings 265a to 265c. The fourth diffraction grating 265d has the same function as the diffraction gratings 215c, 235c, 245c shown in FIGS. 18 to 23. The fifth diffraction grating 265e has the same function as the diffraction gratings 215d, 235d, 245d shown in FIGS. 18 to 23.

The third diffraction grating 265c causes the element of the part not overlapping on the primary diffracted element among the $0^{th}$ reflected element of the disk reflected light beam to be diffracted to the position where the photodetector is not provided. Therefore, this embodiment provides the effect similar to that of the embodiment shown in FIG. 24.

Moreover, in this embodiment, the light beam emitted from the light source 7 passes the third diffraction grating 265c. Since the light beam emitted from the light source 7 is never shielded, the optical element 265 can be applied to the optical disk apparatus shown in FIGS. 19, 21 and 23.

Figure 26:
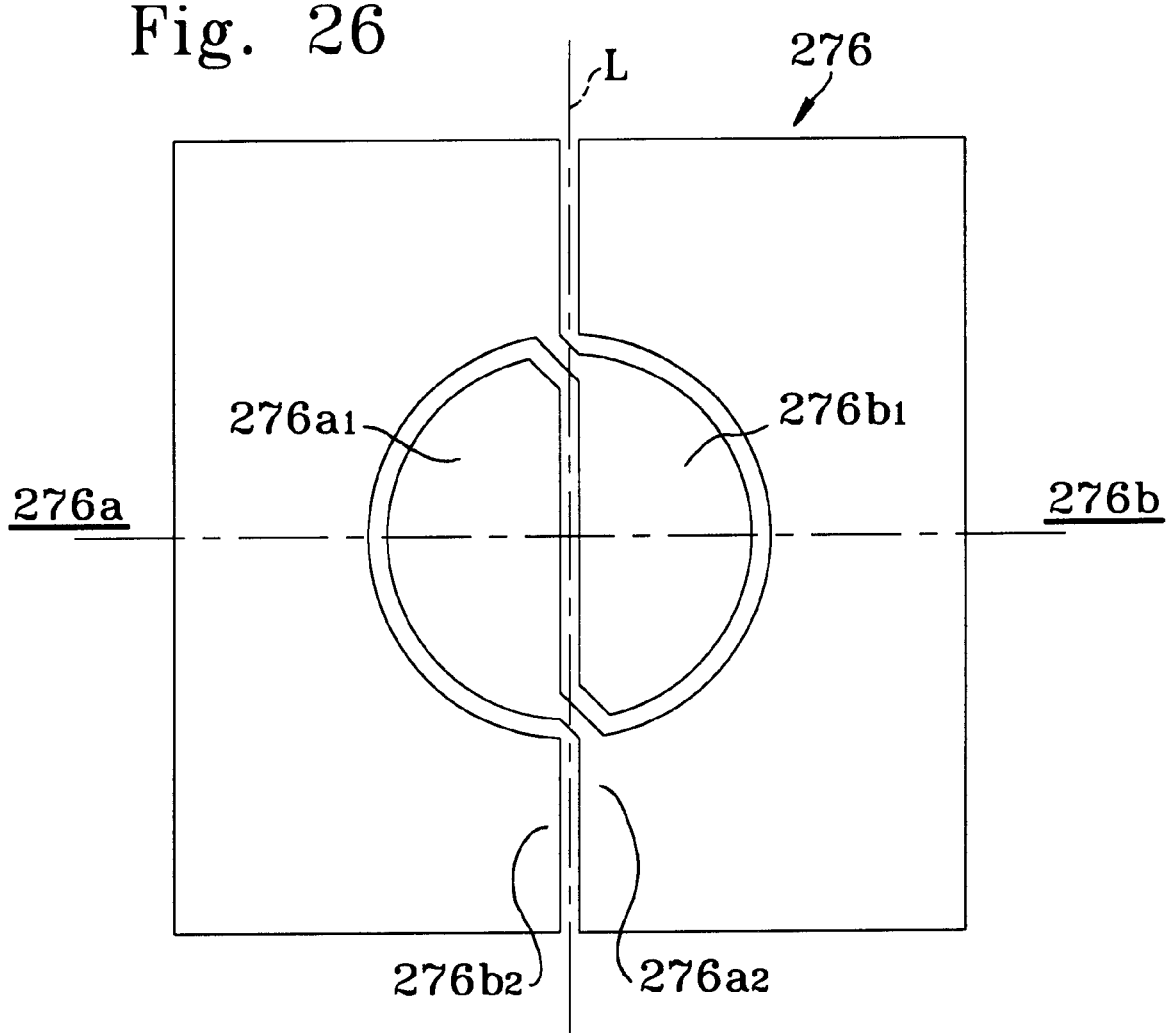
FIG. 26 is a diagram showing yet another example of the optical element of the present invention.

FIG. 26 shows an example of the photodetector. This photodetector has a plurality of light receiving sections which receive at least a portion of the light beam for purposes of balancing the distribution of light in the light receiving sections if the optical axis of the light beam is displaced with respect to the light receiving sections when the light beam is aligned with the target.

This photodetector 276 is provided with a first light receiving section 276a and a second light receiving section 276b. The first light receiving section 276a is provided with a semi-circular region 276a1. The second light receiving section 276b is provided with a semi-circular region 276b1. These semi-circular regions 276a1, 276b1 have a diameter which is equal to or a little smaller than the spot diameter of the light beam. The first light receiving section 276a is also provided with the rectangular region 276a2 formed at the external side of the semi-circular region 276b1. The second light receiving section 276b is provided with the rectangular region 276b2 formed at the external side of the semi-circular region 276a1. The first light receiving section 276a physically couples the semi-circular region 276a1 and rectangular region 276a2. Moreover, the second light receiving section 276b physically couples the semi-circular region 276b1 and rectangular region 276b2. The first light receiving section 276a and second light receiving section 276b are isolated. A differential output of the first and second light receiving sections 276a, 276b is a push-pull signal.

The photodetector 276 is arranged in such a relation that the dividing line L is aligned in the direction parallel to the track. This photodetector 276 has the function similar to that of the optical element explained above. Here, the size of the semi-circular region and rectangular region is set to satisfy the conditions of formulae (2), (3). For example, when the light beam shifts in the direction of arrow mark A (direction orthogonal to the dividing line L), the light beam illuminates a part of the semi-circular region 286b1 and the amount of receiving light of the second light receiving section 276b is relatively reduced in comparison with that of the first light receiving section 276a. On the other hand, since the light beam enters the semi-circular region 276a1 and rectangular region 276b2, the amount of receiving light of the rectangular region 276b2 is added to the amount of receiving light of the semi-circular region 276b1. Accordingly, since the amount of receiving light of the second light receiving section 276b increases relatively in comparison with the amount of receiving light of the first light receiving section 276a, imbalance in the amount of receiving light of the first and second light receiving sections 276a and 276b is corrected.

This photodetector 276 corresponds to the optical means, provided between the condenser lens and photodetector, for correcting offset.

The first light receiving section 376a may be coupled electrically after the semi-circular region 276a1 and rectangular region 276a2 are formed in isolation. Moreover, it is of course possible that such structure can be applied to the second light receiving section 276b.

Figure 27:
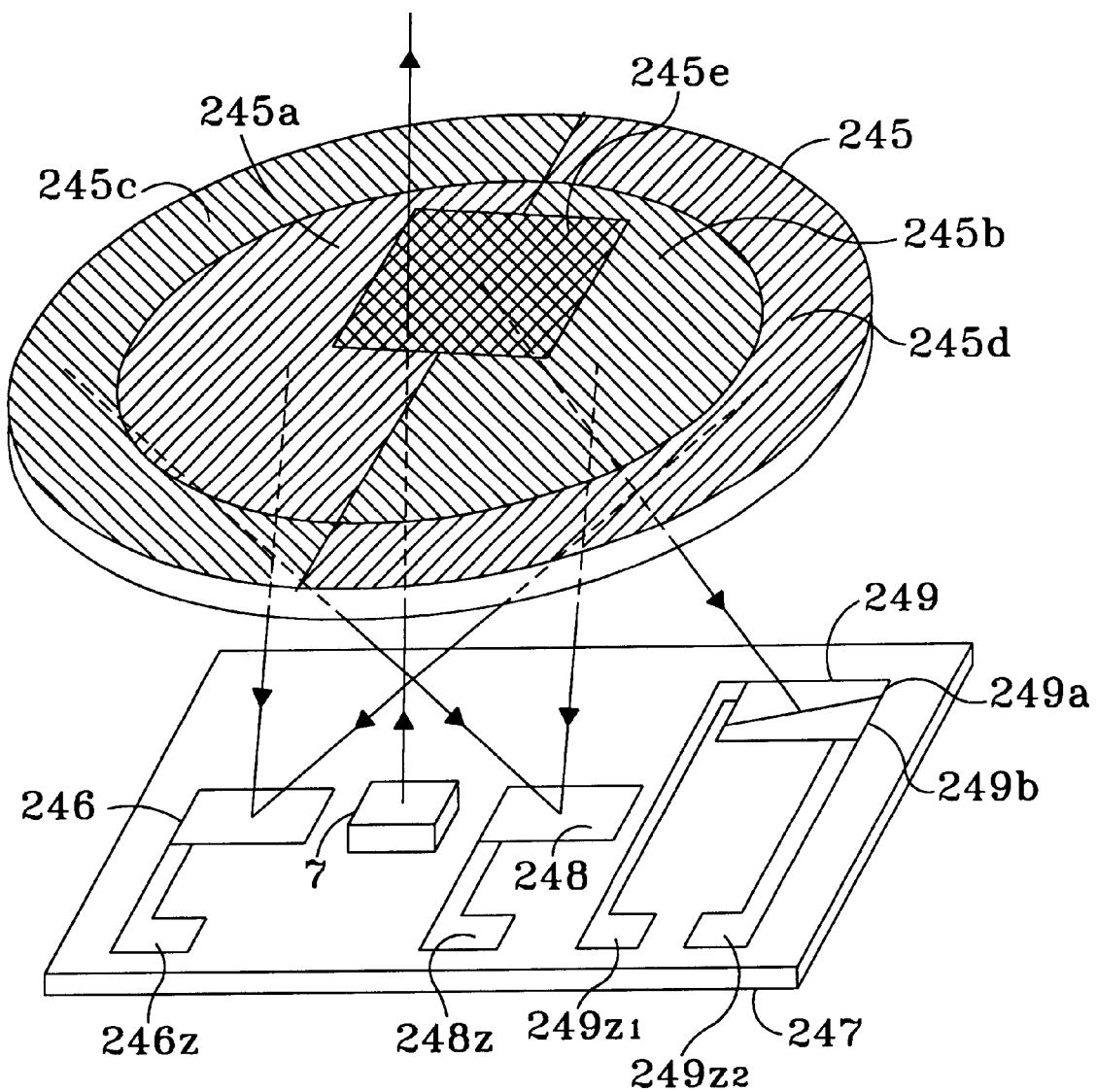
FIG. 27 is a diagram showing a practical example of the optical apparatus shown in FIGS. 22(a) and 22(b).

FIG. 27 shows a practical example of the optical apparatus shown in FIG. 23. As shown in FIG. 27, the light source 7, a couple of photodetectors 246, 248 and two-divided photodetector 249 are mounted on the same silicon substrate 247. Namely, the tracking error detector and focus error detector are mounted on a single silicon substrate 247 utilizing ordinary integrated circuit producing technology. In this structure, since all servo detectors may be mounted by merely mounting the silicon substrate 247 to the housing of package 240, the number of parts and assembling procedures can remarkably be reduced.

The position of the optical element 245 is not required to be adjusted on the package 240. The optical element 245 can be located to the predetermined position through the positional adjustment using a couple of photodetectors 246, 248 for tracking error detection and the positional adjustment using the two-divided photodetector 249 for focus error detection, because the optical element 245 is mounted in the predetermined positional relationship on the same package 240 with the photodetectors 246, 248, 249.

On the silicon substrate 247, the electrodes 246z, 248z, 249z1, and 249z2 of the detectors are formed. The electrode of the light source 7 is not illustrated in FIG. 27.

The embodiment explained above relates to the case where axial displacement is generated due to a shift of the objective lens, but offset can also be corrected even if axial deviation is generated due to an assembling error.

Moreover, if axial displacement of the optical beam is generated due to inclination, imbalance in the amount of receiving light can be corrected by providing an optical means between the condenser lens and photodetector.

In addition, in this embodiment, the diameter of the center region of the optical means is set, for explanation, equal to or a little smaller than the beam diameter of the light beam passing the optical means. When the diameter of the center area is smaller than the beam diameter, positional adjustment of the optical means can be done easily. This is because since a part of the external circumference of the light beam is set to the size as passing the diffraction grating region, imbalance in the amounts of receiving light of a couple of light receiving sections can be absorbed by the effect of the diffraction grating region, so some optical means mounting error is allowed.

In addition, the optical element may be arranged, in the present invention, before the condenser lens. Namely, the optical element may be arranged between the objective lens and condenser lens. In this case, the diffraction grating formed to the optical element is defined by the amount of diffraction depending on the arrangement position.

Moreover, in the present invention, a plurality of diffraction gratings (for example, diffraction gratings 245a to 245e shown in FIG. 27) may be formed directly on the condenser lens. When one surface of the condenser lens is flat, such diffraction grating may be easily formed by attachment to the flat surface of the condenser lens. Namely, the diffraction grating can be formed by coating the plastic material on the flat surface and then forming a slit to the plastic material.

This embodiment has been described mainly in its optical system for tracking error detection but the present invention can also be applied to an optical system for focus error detection and an optical system for an information reading.

The present invention has been described with reference to particular embodiments thereof but it should be understood that the embodiments described are only examples for application of the principle of the present invention. For instance, the optical apparatus can be applied not only to the magneto-optical disk apparatus but also to all optical disk apparatuses. In addition, this optical apparatus can be applied not only to an optical disk apparatus but also to all optical apparatuses for detecting focus error and tracking error.

The many advantages of the invention are now apparent. Imbalance in the amount of receiving light (offset) by the axial deviation of the light beam resulting from axial displacement of the objective lens, inclination of the target object or assembling error of the optical system can be reduced. Offset resulting from assembling errors can also be eliminated. Moreover, since the optical means is arranged between the condenser lens and photodetector, the photodetector in any optical system can correct the offset, and the condenser lens and photodetector, the condenser lens can be arranged within the necessary region and offset can also be eliminated with a simplified and low cost structure. High precision, high speed tracking and highly accurate information reading can be conducted.

Various embodiments of the invention have additional advantages. The beam splitter and condenser lens for detecting tracking error are no longer required. Since the space between the condenser lens and light receiving section is used, an additional region is not required for arranging the optical means. Moreover, the tracking error detector can be mounted easily. Optical elements such as a beam splitter and condenser lens are not required to detect focus error. Also, the focus error detector can be installed easily, and a plurality of optical elements can be structured more easily.

While the principles of the invention have been described above in connection with specific apparatus and applications, it is to be understood that this description is made only by way of example and not as a limitation on the scope of the invention.

What is claimed is:

1. An optical apparatus for decoding information stored in a target comprising:
    a source of light,
    a condenser lens through which the light passes, said condenser lens forming the light into a beam which has an optical axis,
    the beam being sent to the target after the light passes through said condenser lens, the target encoding the light beam with the information and directing the encoded light beam to first and second light receiving sections, and
    an optical device adapted to allow said light beam to pass therethrough for balancing the distribution of the light in said first and second light receiving sections if the optical axis of said light beam is displaced with respect to said light receiving sections when said light beam is aligned with the target,
    said optical device having a first half for directing said light beam to said first light receiving section, a second half for directing said light beam to said second light receiving section, a first light directing region adjacent said first half for directing the light beam to said second light receiving section, and a second light directing region adjacent said second half for directing said light beam to said first light receiving section.

2. The optical apparatus of claim 1 wherein said optical device comprises:
    an optical device through which the light beam passes before it is received by said first and second light receiving sections, said optical device having a circular-like region through which the light may pass, said circular-like region having a diameter which is equal to or smaller than the diameter of said light beam,
    said circular-like region further having at least first and second halves, wherein light passing through said first half is directed towards said first light receiving section, and light which passes through said second half is directed to said second light receiving section,
    said optical device further having a first light directing device outside of said first half of said circular-like region which directs light to said second light receiving section, and
    a second light directing device outside of said second half of said circular-like region which directs light to said first light receiving section.

3. The optical apparatus of claim 2 wherein said circular-like region is circular.

4. The optical apparatus of claim 2 wherein said first and second circular-like regions are formed of arcs having a radius which is greater than half the total width of said circular-like region, and an origin displaced from the center of said optical device.

5. The optical apparatus of claim 2 wherein said circular-like regions form an elliptical shape.

6. The optical apparatus of claim 2 wherein said first and second light directing devices are diffraction gratings.

7. The optical apparatus of claim 2 wherein said first and second light directing devices are prisms.

8. The optical apparatus of claim 2 wherein said first and second light directing devices are circular lenses.

9. The optical apparatus of claim 2 comprising a shielding region in the circular-like regions.

10. The optical apparatus of claim 9 wherein said shielding region is opaque.

11. The optical apparatus of claim 9 wherein said shielding region is a diffraction grating.

12. The optical apparatus of claim 2 wherein said first and second halves are third and fourth light directing devices, said first and second halves of said first and second light receiving sections being offset from said axis on different sides of said optical device.

13. The optical apparatus of claim 12 comprising a third light receiving section, said optical device further having a fifth light directing device which directs part of said light beam to said third light receiving section.

14. The optical apparatus of claim 13 wherein said third light receiving section is offset with respect to said axis.

15. The optical apparatus of claim 14 wherein said light source and said first, second and third light receiving sections are mounted on a single substrate.

16. The optical apparatus of claim 14 wherein the target is a track in a track medium, said first and second light receiving sections generate a tracking error signal, and said third light receiving section generates a focus error signal.

17. The optical apparatus of claim 13 wherein said first, second, third, fourth and fifth light directing devices are formed as a single thin plate type diffraction grating.

18. The optical apparatus of claim 12 wherein said light source and said first and second light receiving sections are mounted on a single substrate.

19. The optical apparatus of claim 1 wherein said optical device comprises:
    an optical device through which the light beam passes before it is received by said first and second light receiving sections, said optical device having a circular-like region through which the light passes, said circular-like region having a cross-sectional area which is equal to or smaller than the cross-sectional area of the light beam,
    said circular-like region further having at least first and second halves, wherein light passing through said first half is directed towards said first light receiving section, and light which passes through said second half is directed to said second light receiving section, the paths of the light passing through said first and second halves crossing each other as they approach said optical detector,
    said optical device further having a first light directing device outside of said first half of said circular-like region which directs light to said second light receiving section, and
    a second light directing device outside of said second half of said circular-like region which directs light to said first light receiving section, the paths of the light passing through said first and second light directing devices not crossing each other as they approach said first and second light receiving sections.

20. The optical apparatus of claim 19 wherein said first and said second halves of said circular-like region are conical prisms.

21. The optical apparatus of claim 19 wherein said first and said second halves of said circular-like region are third and fourth diffraction gratings.

22. The optical apparatus of claim 21 wherein said first and second light receiving sections are offset with respect to said optical axis.

23. The optical apparatus of claim 1 wherein the target is a track in a disk medium.

24. The optical apparatus of claim 1 wherein said first and second half of said optical device form a circular region and said first and second light directing regions are concentric to said first and second halves.

25. The optical apparatus of claim 1 wherein said first and second halves are made of diffraction gratings.

26. The optical apparatus of claim 1 wherein said first and second light directing regions are made of diffraction gratings.

27. The optical apparatus of claim 1 wherein said the light beam that passes through said first and second light directing regions cross each other as they approach said respective second and first light receiving sections.

28. The optical apparatus of claim 1 wherein said first light receiving section is formed on a first photo detector and said second light receiving section is formed on a second photo detector.

29. The optical apparatus of claim 28 wherein said first photo detector and said second photo detector are provided spaced one on each side of said optical axis.

* * * * *